US009817761B2

(12) United States Patent
Ben-Shemesh et al.

(10) Patent No.: US 9,817,761 B2
(45) Date of Patent: Nov. 14, 2017

(54) METHODS, SYSTEMS, AND COMPUTER READABLE MEDIA FOR OPTIMIZATION OF HOST SEQUENTIAL READS OR WRITES BASED ON VOLUME OF DATA TRANSFER

(75) Inventors: Koren Ben-Shemesh, Jerusalem (IL); Yan Nosovitsky, Heraeliya (IL)

(73) Assignee: SanDisk Technologies LLC, Plano, TX (US)

( * ) Notice: Subject to any disclaimer, the term of this patent is extended or adjusted under 35 U.S.C. 154(b) by 251 days.

(21) Appl. No.: 13/345,499

(22) Filed: Jan. 6, 2012

(65) Prior Publication Data
US 2013/0179632 A1    Jul. 11, 2013

(51) Int. Cl.
*G06F 12/02* (2006.01)
*G06F 12/0862* (2016.01)

(52) U.S. Cl.
CPC .......... *G06F 12/0862* (2013.01); *G06F 12/02* (2013.01)

(58) Field of Classification Search
CPC .................................................. G06F 12/0862
USPC ........................................................ 711/137
See application file for complete search history.

(56) References Cited

U.S. PATENT DOCUMENTS

| | | | |
|---|---|---|---|
| 7,249,222 B1* | 7/2007 | Bellis et al. | 711/137 |
| 7,359,890 B1* | 4/2008 | Ku | G06F 17/3048 |
| 7,809,883 B1* | 10/2010 | Fair et al. | 711/113 |
| 8,429,351 B1* | 4/2013 | Yu | G06F 12/0862 711/132 |
| 2004/0128449 A1* | 7/2004 | Osborne et al. | 711/137 |
| 2005/0114289 A1* | 5/2005 | Fair | 707/1 |
| 2006/0112232 A1* | 5/2006 | Zohar et al. | 711/137 |

\* cited by examiner

*Primary Examiner* — Tuan Thai
*Assistant Examiner* — Gautam Sain
(74) *Attorney, Agent, or Firm* — Stoel Rives LLP

(57) ABSTRACT

A method for optimization of host sequential reads based on volume of data includes, at a mass data storage device, pre-fetching a first volume of predicted data associated with an identified read data stream from a data store into a buffer memory different from the data store. A request for data from the read data stream is received from a host. In response, the requested data is provided to the host from the buffer memory. While providing the requested data to the host from the buffer memory, it is determined whether a threshold volume of data has been provided to the host from the data buffer memory. If so, a second volume of predicted data associated with the identified read data stream is pre-fetched from the data store and into the buffer memory. If not, additional predicted data is not pre-fetched from the data store.

27 Claims, 17 Drawing Sheets

METHODS, SYSTEMS, AND COMPUTER READABLE MEDIA FOR OPTIMIZATION OF HOST SEQUENTIAL READS OR WRITES BASED ON VOLUME OF DATA TRANSFER

TECHNICAL FIELD

The subject matter described herein relates to improving flow of data to and from memory storage devices. More particularly, the subject matter described herein relates to methods, systems, and computer readable media for optimization of host sequential reads or writes based on volume of data transfer.

BACKGROUND

Mass storage devices that provide data storage that can be written to and read from by another entity such as a host can improve their performance through the use of algorithms that predict what the host will request before the host actually requests it. For example, a prediction algorithm may detect that a host has requested data from sequential sectors in a memory and predict, based on that observation, that the host will be likely or not likely to continue to request data from subsequent sequential sectors. If the prediction algorithm determines that the host is likely to continue requesting data from sequential sectors in memory, the prediction algorithm may cause the memory storage device to pre-fetch data from the next logical sector or sectors and store that data in a buffer so that if the host does request that data, the memory storage device can supply that data without delay. Prediction algorithms can significantly improve the performance of mass data storage systems that use as their primary storage memory that has a relatively slow or widely varying access time, such as hard disk drives or remote storage, or memory that provides data only in large chunks from which the portion of desired data must then be extracted, e.g., devices that use NAND FLASH memory, such as USB drives and solid state drives.

When the prediction algorithm guesses correctly, i.e., the data which is pre-fetched was the data that the host next asked for, the time between when the host requests the data and the when the device provides the data can be greatly reduced. However, should the prediction algorithm guess incorrectly, the pre-fetched data is not needed and is discarded. Meanwhile, the device must fetch the correct data, which is then provided to the host after some delay.

FIG. 1 is a flowchart illustrating a conventional method for performing host sequential reads. At step 100, a stream is detected as a candidate for predictive pre-fetching, or read buffering. For example, a memory device may detect that the host has performed a threshold number of sequential reads and from that point on perform a read-ahead or pre-fetch every time it receives another sequential read from the host. In response to detecting a candidate stream for pre-fetch, at step 102 data is pre-fetched from mass storage memory into a buffer memory in anticipation of subsequent reads.

The process waits at step 104 until a subsequent read is detected. If an I/O read is detected, at step 106 the requested data is output from the buffer memory. At step 108, additional data is pre-fetched from mass storage memory into the buffer memory. In other words, in the conventional approach illustrated in FIG. 1, once a stream is identified as a candidate for pre-fetch, additional data is pre-fetched from the mass storage memory into the buffer memory every time an I/O read occurs.

However, this approach has some disadvantages because it does not take into account the size of the data accesses. For example, once the conventional prediction algorithm illustrated in FIG. 1 activates the read-ahead operations, it pre-fetches additional data every time the device receives a read command from the host, regardless of the amount of data that the read command asked for. Two examples illustrate the weaknesses of this conventional approach:

In the first example, a host requests X amount of data with every read command, but only ½X of data is moved from the mass storage memory into the buffer memory after each read command. Since the data is drained from the buffer memory faster than the buffer memory is being replenished, the buffer memory will inevitably run out of data, a condition referred to as an underrun. In the conventional method described above, any time the host requests, on average, more data for every read command than is pre-fetched at the end of each read command, the buffer memory will eventually underrun, unless the host stops requesting data from the stream, e.g., the data stream terminates.

In the second example, a host requests X amount of data with every read command, but 2X amount of data is moved from mass storage memory into the buffer memory after each read command. Since the data is drained from the buffer memory slower than the buffer memory is being filled, the buffer memory will inevitably run out of memory, or overrun (or the buffer memory will continue to increase in size until there is no more memory in the system available for it to use.) In the conventional method described above, any time the host requests, on average, less data for every read command than is pre-fetched at the end of each read command, the buffer memory will eventually overrun, unless the host stops requesting data from the stream.

FIGS. 2A-2D show steps of an example operation according to the conventional process shown in FIG. 1. In FIG. 2A, block 1, an incoming read command, R7, is identified as being seventh in a series of read accesses to a contiguous set of logical block addresses within a mass storage memory 200 and thus part of a read data stream that is a candidate for read buffering. At block 2, some amount of a buffer memory is set aside as a read buffer 202 for the read data stream. In the example shown in FIGS. 2A-2D, read buffer 202 is divided into six identically-sized portions, referred to herein as buffers 1 through 6. At block 3, data predicted to be part of the read data stream will be pre-fetched into read buffer 202 from mass storage memory 200. This data transfer is shown as a set of arrows 4, which fill buffers 1 through 4 of read buffer 202.

In FIG. 2B, block 5, the portion of the pre-fetched data that was requested by R7 and shown in FIG. 2B as the darkly-colored portion of buffer 1 of read buffer 202 is provided to the host from read buffer 202. This data transfer is shown as arrow 6.

In FIG. 2C, another read command, R8, is received. The data requested by R8 is provided to the host from read buffer 202. This data transfer is shown as arrow 7. At block 8, once read command R8 has completed, this triggers a predictive pre-fetch of more data from mass storage memory 200 into read buffer 202. This data transfer is shown as arrow 9.

In FIG. 2D, block 10, some portion of read buffer 202 is released. Another read command, R9, is received. The data requested by R9 is provided to the host from read buffer 202. This data transfer is shown as arrow 11. At block 12, once read command R9 has completed, this triggers a predictive pre-fetch of more data from mass storage memory 200 into read buffer 202. This data transfer is shown as arrow 13.

In the example shown in FIGS. 2A through 2D it can be seen that the buffer memory is being filled faster than it is being drained. If this trend continues the buffer memory will overflow.

A buffer memory may be used to increase performance of sequential I/O writes as well, by accumulating multiple, sequential write data into the buffer memory and writing the accumulated data from the buffer memory into the mass storage memory in a single transfer. A conventional approach is shown in FIG. 3.

FIG. 3 is a flowchart illustrating a conventional method for performing host sequential writes. At step 300, a candidate stream for write buffering is detected. In response to detecting a candidate stream for write buffering, at step 302 some amount of buffer memory is reserved for the candidate stream. The process then waits at step 304 until a subsequent sequential I/O write of more stream data is detected, at which time the process goes to step 306. At step 306, data from the sequential write starts to fill the buffer memory rather than being written directly to the mass storage memory. As long as there is more data to be written, which is the condition that is being tested at step 308, the process will return to step 306 and write data will continue to be written to the buffer memory. Once all of the data has been written to buffer memory, the process goes to step 310. At step 310, write data is flushed from buffer memory to mass storage memory.

The process shown in FIG. 3 has some disadvantages, however. Like the conventional sequential read process shown in FIG. 1, the conventional sequential write process shown in FIG. 3 also does not take into account the size of the data accesses More specifically, in the conventional process shown in FIG. 3, data is flushed from the buffer memory to mass storage memory only after the write is complete. Two examples illustrate the weaknesses of this conventional approach:

In the first example, each write command sends a large amount of data. Because the conventional method shown in FIG. 3 does not flush the write buffer until after the write has completed, a large amount of buffer memory remains occupied and unavailable for use for longer than is absolutely necessary. When writing a large amount of data, this can cause a buffer overflow.

In the second example, each write command sends a small amount of data. If the conventional method shown in FIG. 2 flushes data from buffer memory after every write whether or not the buffer is full this method does not take full advantage of the benefits of writing data to the mass storage memory in large chunks at a time. If the mass storage memory is NAND FLASH, for example, it would be better to wait make one write to a page of FLASH memory than to make two writes to the same page of FLASH memory, e.g., where the first write fills the first half of the page and the second write fills the second half of the page.

FIGS. 4A-4G show steps of an example operation according to the conventional process shown in FIG. 1. In FIG. 4A, block 1, an incoming write command, W7, is identified as being seventh in a series of writes to a contiguous set of logical block addresses within a mass storage memory 400 and thus part of a candidate write data stream. At block 2, some amount of a buffer memory is set aside as a write buffer 402 for the write data stream. In the example illustrated in FIGS. 4A-4G, write buffer 402 is subdivided into six portions, buffers 1 through 6. At block 3, the write data is stored in write buffer 402 for later transfer to a mass storage memory 400. Storing the write data from W7 into write buffer 402 is shown as arrow 4, which indicates that the write data was stored into buffer 1 of write buffer 402.

In FIG. 4B, another write command, W8, is received. The write data from W8 is stored into write buffer 402. This data transfer is shown as arrow 5. At block 6, once write command W8 has completed, buffers 1 through 6 are checked to see if any may be flushed and released. In the example shown in FIG. 4B, buffer 1 is flushed, shown as arrow 7, but buffer 2 is not flushed yet.

In FIG. 4C, block 8, buffer 1 of write buffer 402 is released. Another write command, W9, is received. The write data from W9 is stored into write buffer 402. This data transfer is shown as arrow 9. In the example shown in FIG. 4C, the write data from W9 fills nearly 3 buffers of write buffer 402.

In FIG. 4D, block 10, once write command W9 has completed, buffers 1 through 6 are checked to see if any may be flushed and released. In the example shown in FIG. 4D, the completion of W9 triggers a flush of buffers 2, 3, and 4 of write buffer 402. In FIG. 4D, buffer 2 of write buffer 402 is flushed to mass storage memory 400. This data transfer is shown as arrow 11.

In FIG. 4E, block 12, buffer 2 of write buffer 402 is released and buffer 3 of write buffer 402 is flushed to mass storage memory 400. This data transfer is shown as arrow 13.

In FIG. 4F, block 14, buffer 3 of write buffer 402 is released and buffer 4 of write buffer 402 is flushed to mass storage memory 400. This data transfer is shown as arrow 15.

In FIG. 4G, block 12, buffer 4 of write buffer 402 is released. Buffer 5 of write buffer 402 still contains write data but is not yet full and so is not flushed to mass storage memory 400.

In the example shown in FIGS. 4A through 4G it can be seen that the write buffer flushed only after a write command is completed. As a result, write buffer 402 holds write data for longer than is necessary. If multiple writes of large amounts of data are received in a row, write buffer 402 may overflow.

Accordingly, in light of these disadvantages associated with conventional methods for handling sequential reads and writes involving mass storage memory, there exists a need for methods, systems, and computer readable media for optimization of host sequential reads or writes based on volume of data transfer.

SUMMARY

According to one aspect, the subject matter described herein includes a method for optimization of host sequential reads based on volume of data transfer. The method includes, at a non-volatile mass data storage device, pre-fetching a first volume of predicted data associated with an identified read data stream from a non-volatile data store into a buffer memory different from the non-volatile data store. A request for data from the read data stream is received from a host, and in response to receiving this request, the requested data is provided to the host from the buffer memory. While providing the requested data to the host from the buffer memory, it is determined whether a threshold volume of data has been provided to the host from the data buffer memory: if so, a second volume of predicted data associated with the identified read data stream is pre-fetched from the non-volatile data store and into the buffer memory; and if not, additional predicted data is not pre-fetched from the non-volatile data store.

As used herein, the term "volume of data" refers to an amount of data in the generic sense and not in the more specific sense of a predefined collection of data storage area, such as a logical unit, partition, etc.

As used herein, the term "read data stream" refers to a stream of data that has been output from memory or is predicted to be output from memory, where the stream of data is read from contiguous logical block addresses of a memory storage device. The term "read data stream" may alternatively refer to the sequence of commands that produced the above-mentioned stream of output data.

As used herein, the term "host" refers generically to any entity that can request or demand a data transfer to or from a data storage device.

According to another aspect, the subject matter described herein includes a method for optimization of host sequential writes based on volume of data transfer. The method includes, at a non-volatile mass data storage device, reserving a first volume of a buffer memory as a write buffer for storing and accumulating write data associated with an identified write data stream. A request to store data associated with the identified write data stream into a non-volatile data store different from the buffer memory is received from a host, and in response to receiving this request, the data associated with the identified write data stream is stored to the write buffer instead of to the non-volatile data store. While storing the data to the write buffer, it is determined whether a threshold volume of data has been written to the write buffer: if so, at least a portion of the write data stored in the write buffer is flushed to the non-volatile data store; and if not, data is not flushed from the write buffer to the non-volatile data store.

As used herein, the term "write data stream" refers to a stream of data that has been stored to memory or is predicted to be stored to memory, where the stream of data is written to contiguous logical block addresses of a memory storage device. The term "write data stream" may alternatively refer to the sequence of commands that produced the above-mentioned stream of input data.

According to yet another aspect, the subject matter described herein includes a system for optimization of host sequential reads based on volume of data transfer. The system includes a non-volatile data store for mass storage of data, a buffer memory different from the non-volatile data store, and a control module. The control module is configured to pre-fetch a first volume of predicted data associated with an identified read data stream from the non-volatile data store into the buffer memory. When a request for data from the read data stream is received from a host, the control module responds to that request by providing the requested data to the host from the buffer memory. While providing the requested data to the host from the buffer memory, the control module determines whether a threshold volume of data has been provided to the host from the data buffer memory: if so, the control module pre-fetches a second volume of predicted data associated with the identified read data stream from the non-volatile data store and stores this data into the buffer memory; if not, no additional predicted data associated with the identified read data stream is pre-fetched from the non-volatile data store.

According to yet another aspect, the subject matter described herein includes a system for optimization of host sequential writes based on volume of data transfer. The system includes a non-volatile data store for mass storage of data, a buffer memory different from the non-volatile data store, and a control module for reserving a first volume of the buffer memory as a write buffer for storing and accumulating write data associated with an identified write data stream. When a request to store data associated with the identified write data stream into the non-volatile data store is received from a host, the control module responds to the request by storing the data associated with the identified write data stream to the write buffer instead of to the non-volatile data store. While storing the data to the write buffer, the control module determines whether a threshold volume of data has been written to the write buffer: if so, at least a portion of the data stored in the write buffer is flushed from the write buffer to the non-volatile data store; and if not, data is not flushed from the write buffer to the non-volatile data store.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for optimization of host sequential read or write based on volume of data transfer.

Reference will now be made in detail to exemplary embodiments of the present invention, examples of which are illustrated in the accompanying drawings. Wherever possible, the same reference numbers will be used throughout the drawings to refer to the same or like parts.

Figure 5:
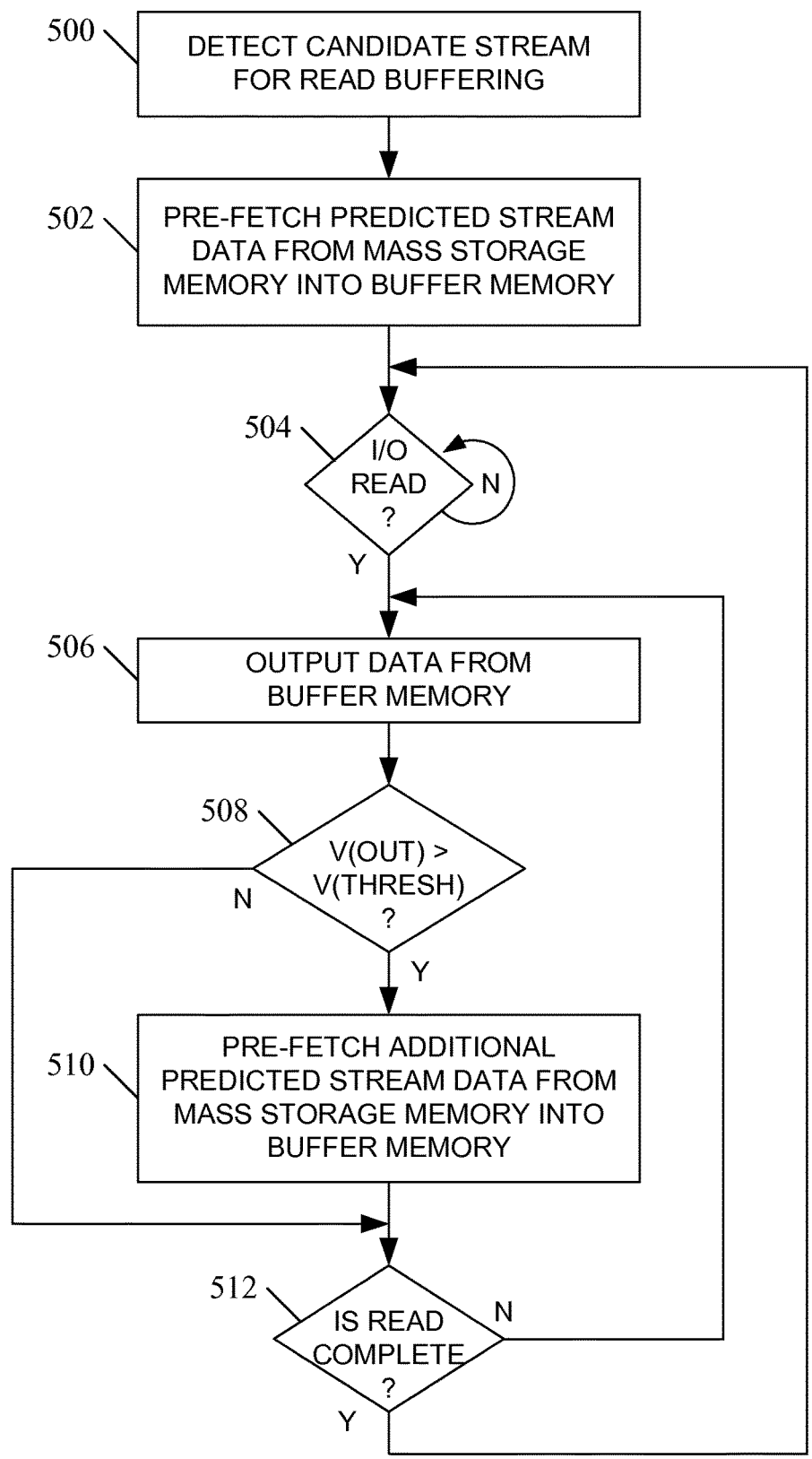
FIG. 5 is a flowchart illustrating an exemplary process for optimization of host sequential reads based on volume of data transfer according to an embodiment of the subject matter described herein.

FIG. 5 is a flowchart illustrating an exemplary process for optimization of host sequential reads based on volume of data transfer according to an embodiment of the subject matter described herein. In the embodiment illustrated in FIG. 5, at step 500 a read data stream is identified as a candidate for read buffering. A possible read data stream may be identified by detection that a threshold number of read commands have been received and that the commands collectively requested a read of a contiguous series of logical block addresses within a mass storage memory.

For example, if a first read command requests data from logical block addresses 0x100 through 0x1FF, a second read command requests data from logical block address 0x200 though 0x2FF, and a third read command requests data from logical block address 0x300 through 0x3FF, it may be reasonable to predict that a request for data from logical block addresses 0x400 through 0x4FF is likely. The sequence of data reads from logical block address 0x100 through 0x3FF has produced a detectable read data stream, and prediction algorithms may estimate how likely that read data stream will continue to be active, i.e., how many more contiguous logical block addresses are likely to be requested by the same host. If the read data stream is likely to continue to be active, that read data stream may be a good candidate for read buffering. The example above is intended to be illustrative and not limiting; there are other ways to identify a read data stream and other factors that may be used to identify a read data stream as a candidate for read buffering.

Once a data stream has been identified as a candidate for read buffering, the process goes to step 502, in which predicted stream data is pre-fetched from the mass storage memory into a buffer memory. Examples of mass storage memories include but are not limited to non-volatile memory storage, such as NAND FLASH memories, HDD, and SDD, as well as remote memories storage devices, such as cloud storage. Examples of buffer memories include but are not limited to RAM memories, including dual data rate (DDR) RAM, dual port RAM, and the like. Systems where mass storage memory is large and slow and buffer memory is small and fast benefit from the subject matter described herein.

In one embodiment, a number of metapages, the number being represented by the variable N, are pre-fetched from mass storage memory into a buffer memory. As used herein, the term "metapage" is a generic term meaning a fixed amount of memory space. A metapage may be any size; in one embodiment a metapage is 256 kilobytes in size, for example. If data is being pre-fetched from a mass storage device that stores data in sectors, metapage size may be represented as a certain number of sectors in size. In the examples shown below, each metapage is 0x100 (512) sectors in size, but other sizes could be used.

The process then waits at step 504 until detection of an I/O read that requests a read of subsequent data from the data stream, at which time the process goes to step 506. At step 506, the requested data is output from the buffer memory instead of from the mass storage memory. At step 508, the volume of data that has been output from the buffer memory so far, represented by the variable "V(out)", is compared to a threshold volume of data, represented by the variable "V(thresh)". In one embodiment, if V(out) has reached or exceeded V(thresh), then at step 510 the additional predicted stream data is pre-fetched from mass storage memory into buffer memory, and either V(out) is reset to zero or a new V(thresh) is defined. In one embodiment, the one or more metapages' worth of predicted data is pre-fetched from mass storage memory into buffer memory. The process then goes to step 512.

In one embodiment, the number of metapages of mass storage memory that is pre-fetched may also be automatically adjusted up or down, based on, for example, volume of data transferred, rate of data transferred, average time between received read requests, and so on. In one embodiment, data transfer rate may be adjusted based on a predefined profile. For example, when a read buffer is first created, at step 502, 10 metapages of data may be pre-fetched, and when additional metapages of predicted data are pre-fetched at block 510, the first three times that block 510 is entered, 2 additional metapages are pre-fetched, and after that every time block 510 is entered 1 additional metapage is pre-fetched.

If, at step 508, V(out) is less than V(thresh), step 510 is not performed, and the process goes directly to step 512. At step 512, it is determined whether the read is complete. If not, the process returns to step 506. If all of the data requested by the I/O read has been sent to the host or other requesting entity, the process returns to step 504 and waits for an I/O read that requests subsequent data from the data stream.

For simplicity, the process shown in FIG. 5 does not include other steps that could be implemented by one of ordinary skill in the art, such as detecting when the data stream is complete and releasing the metapages of buffer memory that had been reserved for read buffering of that stream. For example, step 504 is simplified, and does not show details such as how to determine when the I/O read is the next read in the buffered stream, or what to do when the I/O read is not the next read in the buffered stream, and other implementation specifics. For example, in one embodiment, the process may tolerate a certain number of non-data-stream-related I/O operations before deciding to stop read buffering. In another embodiment, the process may define a time limit during which a read of the next portion of the data stream must be received or else read buffering will cease and the metapages of buffer memory will be released.

Figure 1:
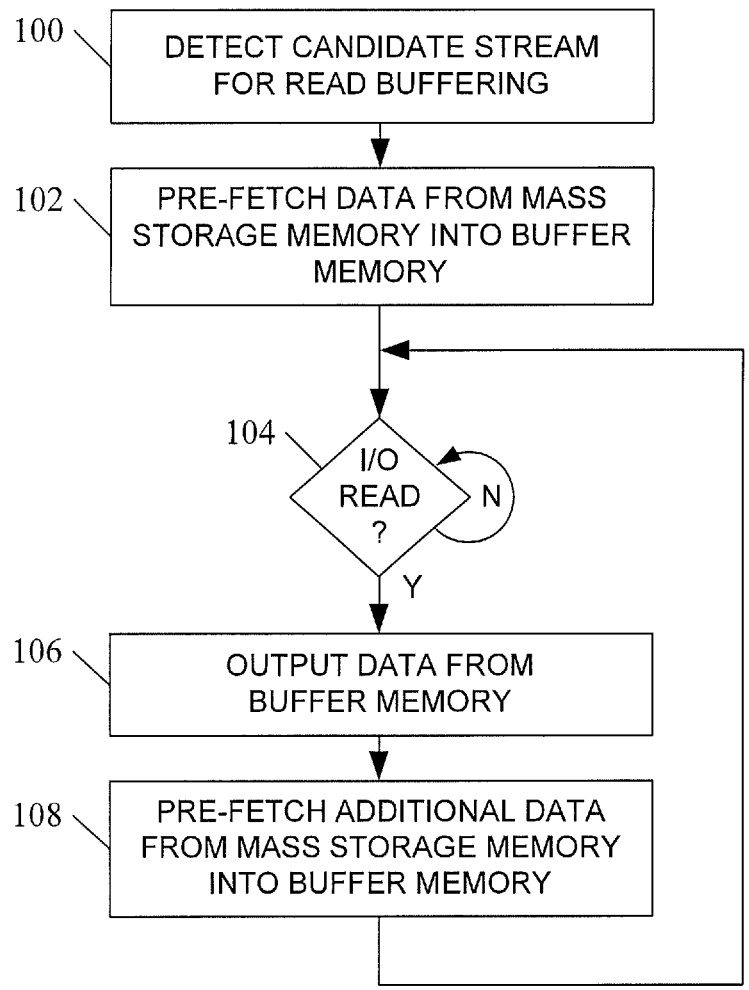
FIG. 1 is a flowchart illustrating a conventional method for performing host sequential reads.
Figure 2A:
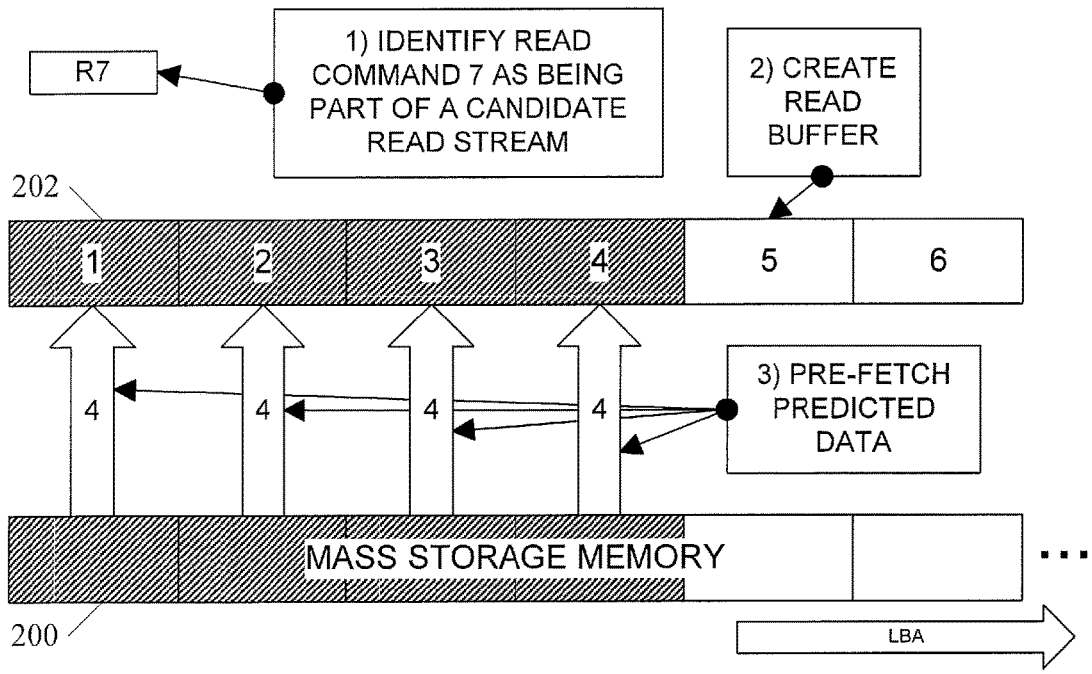
FIGS. 2A-2D illustrate steps of an example operation according to a conventional method for performing host sequential reads.
Figure 2B:
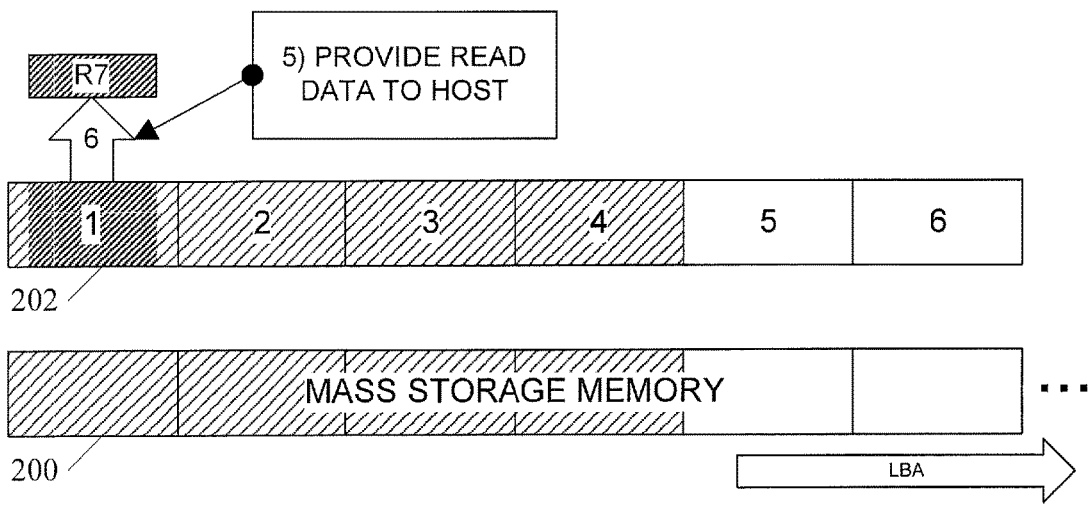
Figure 2C:
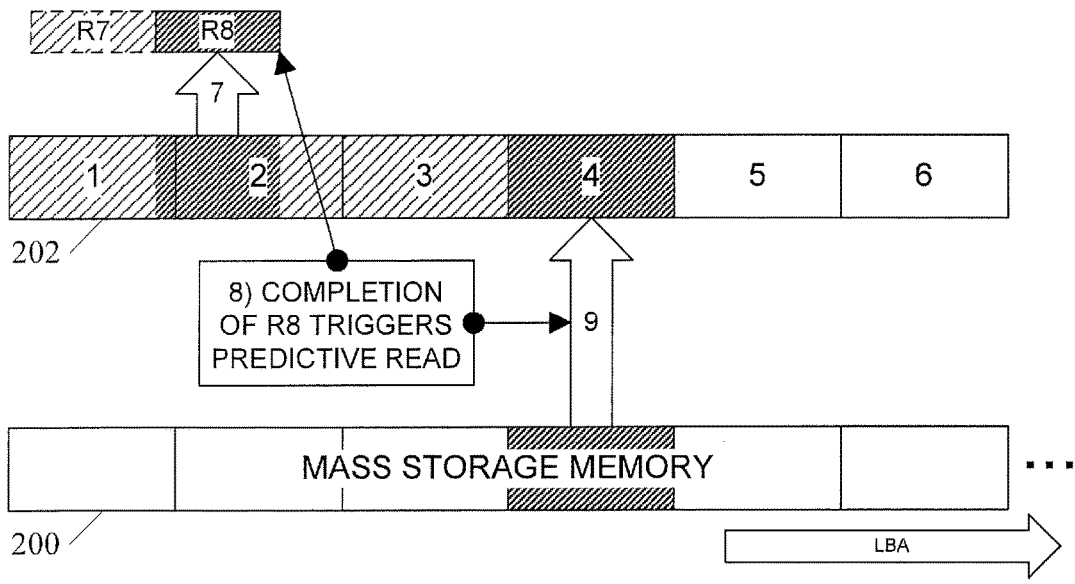
Figure 2D:
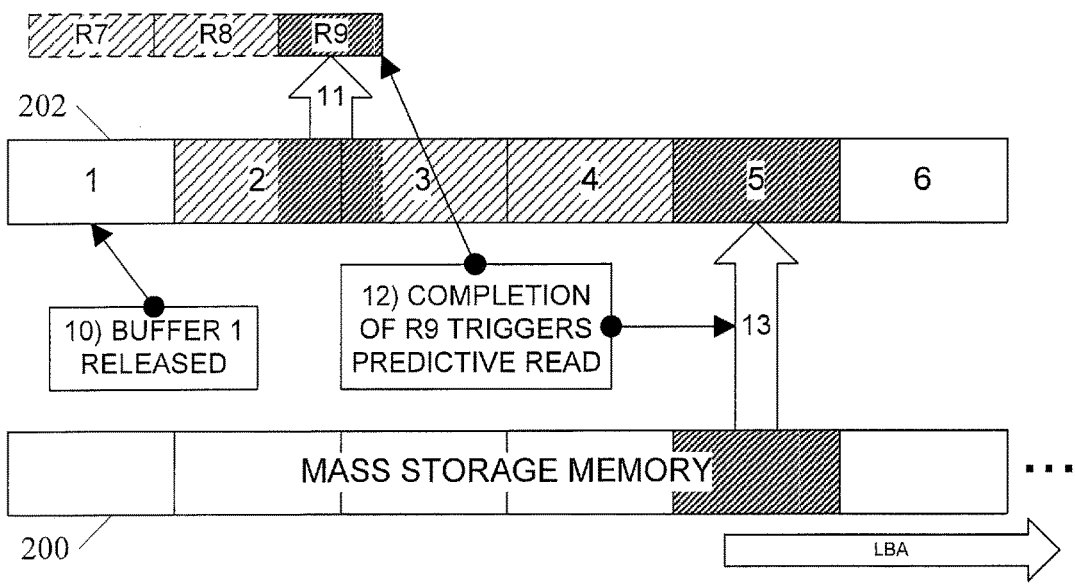

Regardless of how these other details are implemented, however, the embodiment illustrated in FIG. 5 has advantages over the conventional method for processing sequential reads illustrated in FIG. 1. In contrast to the conventional method illustrated in FIG. 1, which pre-fetches more data from mass storage memory into the buffer memory after every read command is received, the embodiment described in FIG. 5 pre-fetches metapages of data from the mass storage memory on a demand or as-needed basis, and is therefore less likely to suffer an overrun or underrun condition. Moreover, a system that implements the process shown in FIG. 5 may implement this process for each of one or more identified read data streams.

FIGS. 6A-6F illustrate steps of an example operation according to an exemplary process for performing host sequential reads based on volume of data transfer according to an embodiment of the subject matter described herein. In the embodiment illustrated in FIG. 6A, at block 1, an incoming read command, R7, is identified as being seventh in a series of read accesses to a contiguous set of logical block addresses within a mass storage memory 600 and is thus part of a read data stream that is a candidate for read buffering. In response to identifying the read data stream, at block 2, some amount of a buffer memory is reserved as a read buffer 602 for the read data stream. In the embodiment illustrated in FIGS. 6A-6F, read buffer 602 is divided into five metapages, labeled 1 through 5.

At block 3, data predicted to be part of the read data stream is pre-fetched into read buffer 602 from mass storage memory 600. This data transfer is shown as arrows 4. In the embodiment illustrated in FIG. 6A, three metapages of data are read from mass storage memory 600 into read buffer 602, but another number of metapages may be used. Note that the metapage blocks may be aligned to logical block addresses that correspond to some internal structure of the mass storage memory 600, such as NAND FLASH pages or HDD clusters, and that starting LBA of metapage 1, for example, may be different from the start address of the data requested by R7.

Figure 6A:
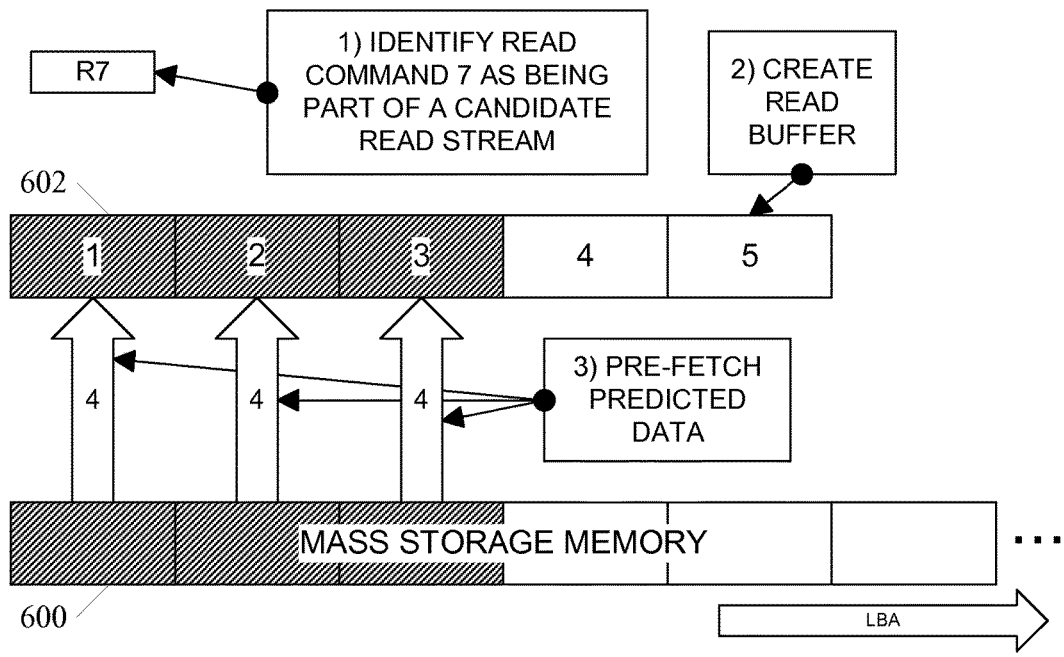
FIGS. 6A-6F illustrate steps of an example operation according to an exemplary process for performing host sequential reads based on volume of data transfer according to an embodiment of the subject matter described herein.
Figure 6B:
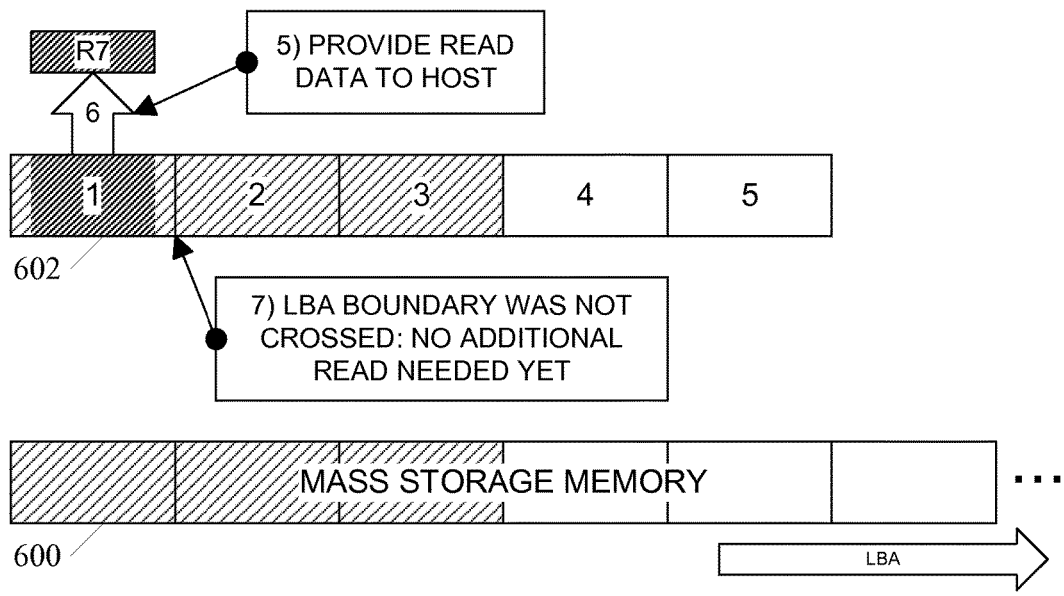

In FIG. 6B, block 5, the portion of the pre-fetched data that was requested by R7 and shown in FIG. 6B as the darkly shaded portion of metapage 1 of read buffer 602 is provided to the host from read buffer 602. This data transfer is shown as arrow 6. In the embodiment illustrated in FIGS. 6A-6F, logical block addresses are used to measure the volume of data that has been provided to the host from read buffer 602. In one embodiment, the LBA address boundaries between metapages may be values that trigger additional pre-fetches. Thus, at block 7, it is noted that a logical block address boundary, and specifically the LBA boundary between metapage 1 and metapage 2 of read buffer 602, has not been crossed yet. In one embodiment, this may be interpreted to mean that metapage 1 of read buffer 602 may still contain predictively pre-fetched data that the host has not yet requested, and so pre-fetching additional predicted data from mass storage memory 600 into read buffer 602 is not yet needed.

Thus, in contrast to the conventional method shown in FIG. 1, which always pre-fetches additional data after every read command, the process shown in FIGS. 6A-6F pre-fetches additional data based on the volume of data being requested by the host, and does not always pre-fetch more data after every read.

Figure 6C:
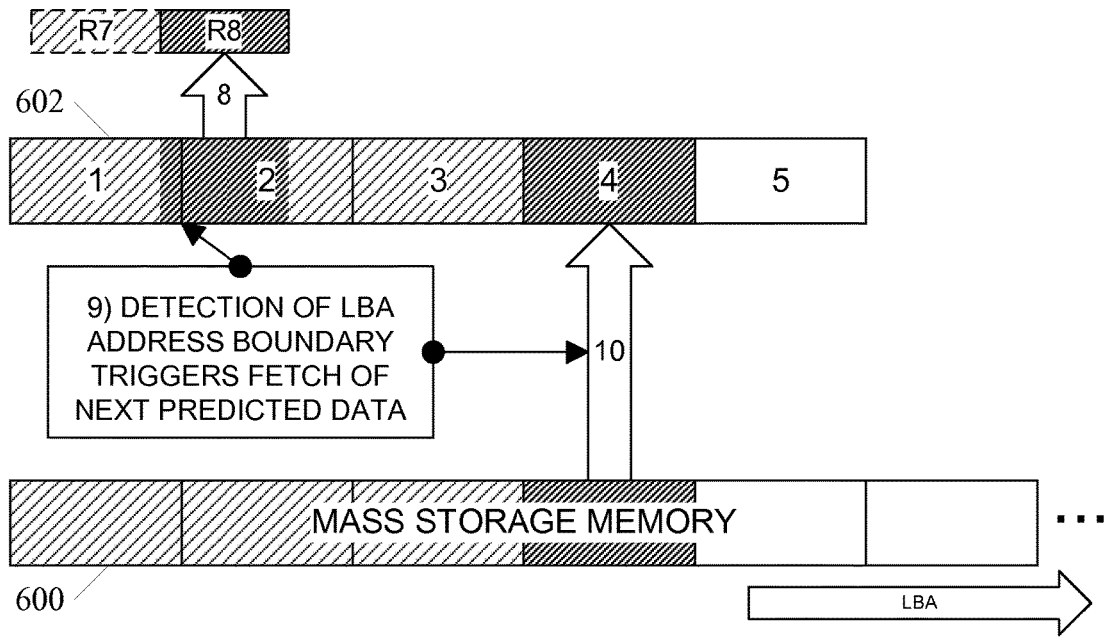

In FIG. 6C, another read command, R8, is received. The data requested by R8 is provided to the host from read buffer 602. This data transfer is shown as arrow 8. At block 9, the system detects that the LBA of data being provided to the host in response to R8 has crossed the LBA boundary between metapage 1 and metapage 2, which triggers a predictive pre-fetch of more data from mass storage memory 600 into read buffer 602. This data transfer is shown as arrow 10. In one embodiment, a hardware interrupt may be set to trigger when a certain value appears on an address bus or register that is involved with the transfer of data to or from mass storage memory 600 and/or read buffer 602.

Figure 6D:
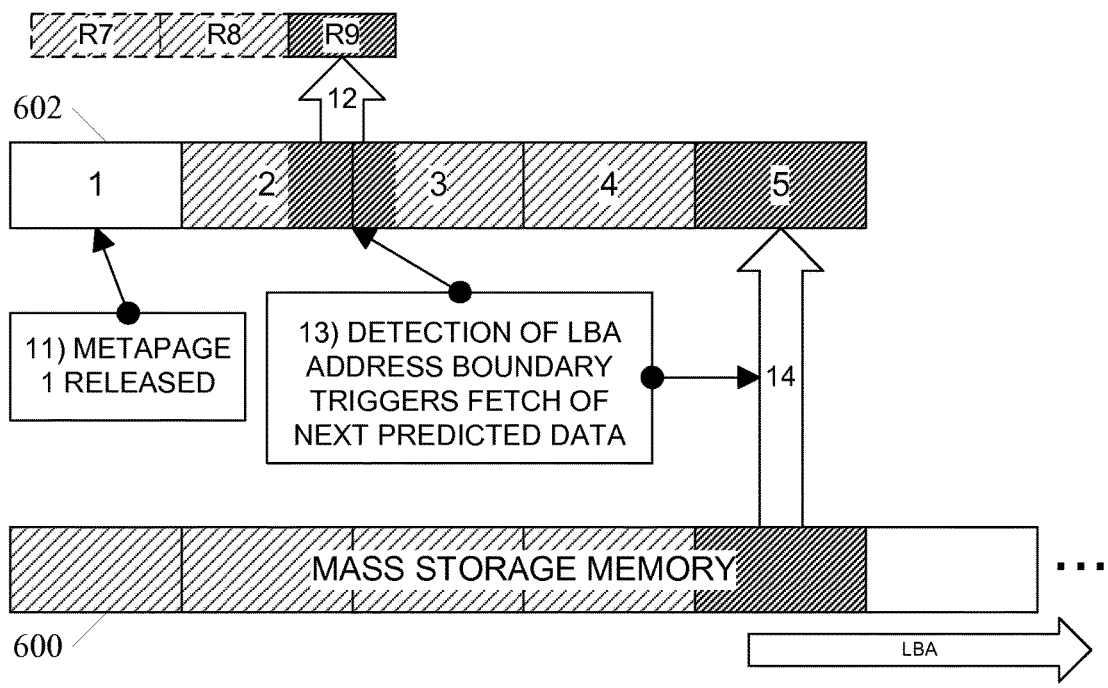

In FIG. 6D, block 11, the system detects that metapage 1 is "empty", i.e., all of the data requested by the host that was located in metapage 1 has been provided to the host. As a result metapage 1 is released, e.g., that portion of read buffer 602 is made available for use to store new pre-fetched predicted data. Also in FIG. 6D, another read command, R9, is received. The data requested by R9 is provided to the host from read buffer 602. This data transfer is shown as arrow 12. At block 13, the system detects that the LBA of data being provided to the host in response to R9 has crossed the LBA boundary between metapage 2 and metapage 3, which triggers a predictive pre-fetch of more data from mass storage memory 600 into read buffer 602. This data transfer is shown as arrow 14.

Figure 6E:
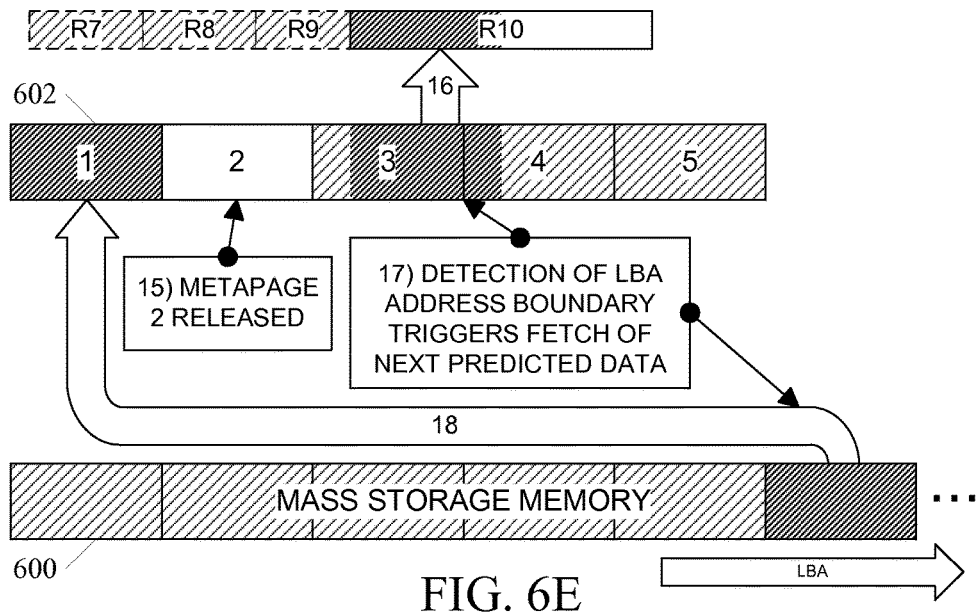

In FIG. 6E, block 15, empty metapage 2 is released. Another read command, R10, is received, and the transfer of data from read buffer 602 to the host begins. This data transfer is shown as arrow 16. During this transfer, at block 17, the system detects the LBA of data being provided to the host in response to R10 has crossed the LBA boundary between metapage 3 and metapage 4, which triggers a predictive pre-fetch of more data from mass storage memory 600 into newly-available metapage 1. This data transfer is shown as arrow 18.

Figure 6F:
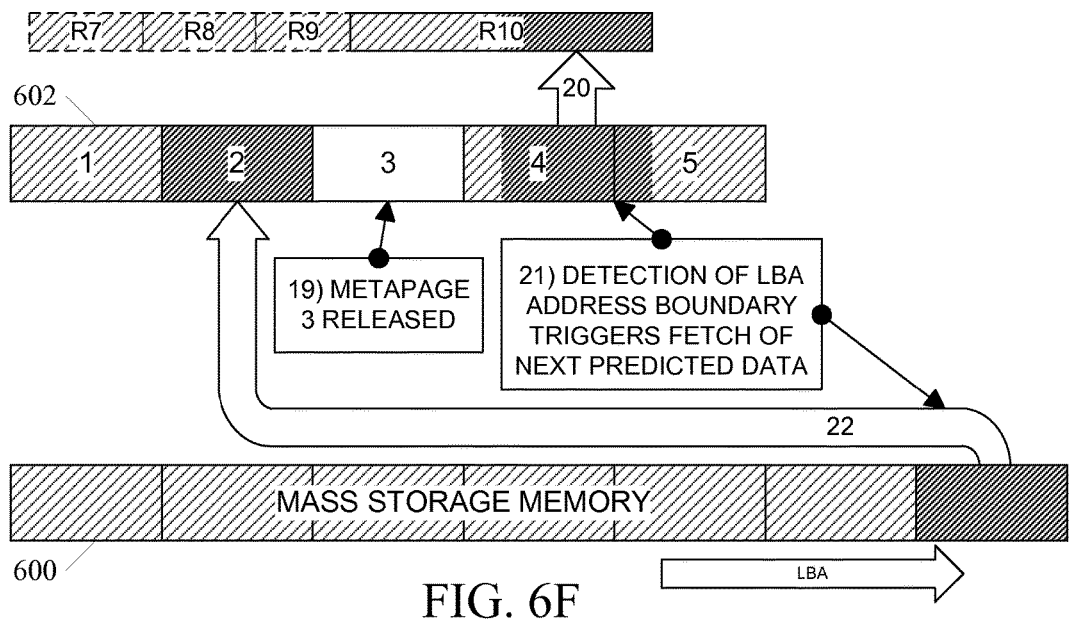

In FIG. 6F, read command R10 continues. Now empty metapage 3 is released. Data requested by R10 continues to be provided to the host. This data transfer is shown as arrow 20. At block 21, the system detects the LBA of data being provided to the host in response to R10 has crossed the LBA boundary between metapage 4 and metapage 5, which triggers a predictive pre-fetch of more data from mass storage memory 600 into newly-available metapage 2. This data transfer is shown as arrow 22.

Thus, in contrast to the conventional method shown in FIG. 1, which does not pre-fetch additional data until after a read command has fully completed, the process shown in FIGS. 6A-6F pre-fetch additional data when it is needed, even during the execution of a read command, based on the volume of data being requested by the host. One advantage that the process shown in FIGS. 6A-6F has over the conventional method shown in FIG. 1 is that the method shown in Figure requires a read buffer that is at least as big as the largest amount of data that a read command may request. In contrast, the process shown in FIGS. 6A-6F can operate using a read buffer that is smaller than amount of data requested by a read command, since metapages of the read buffer are released as soon as they are empty and can therefore be reused for the same read command.

Figure 7:
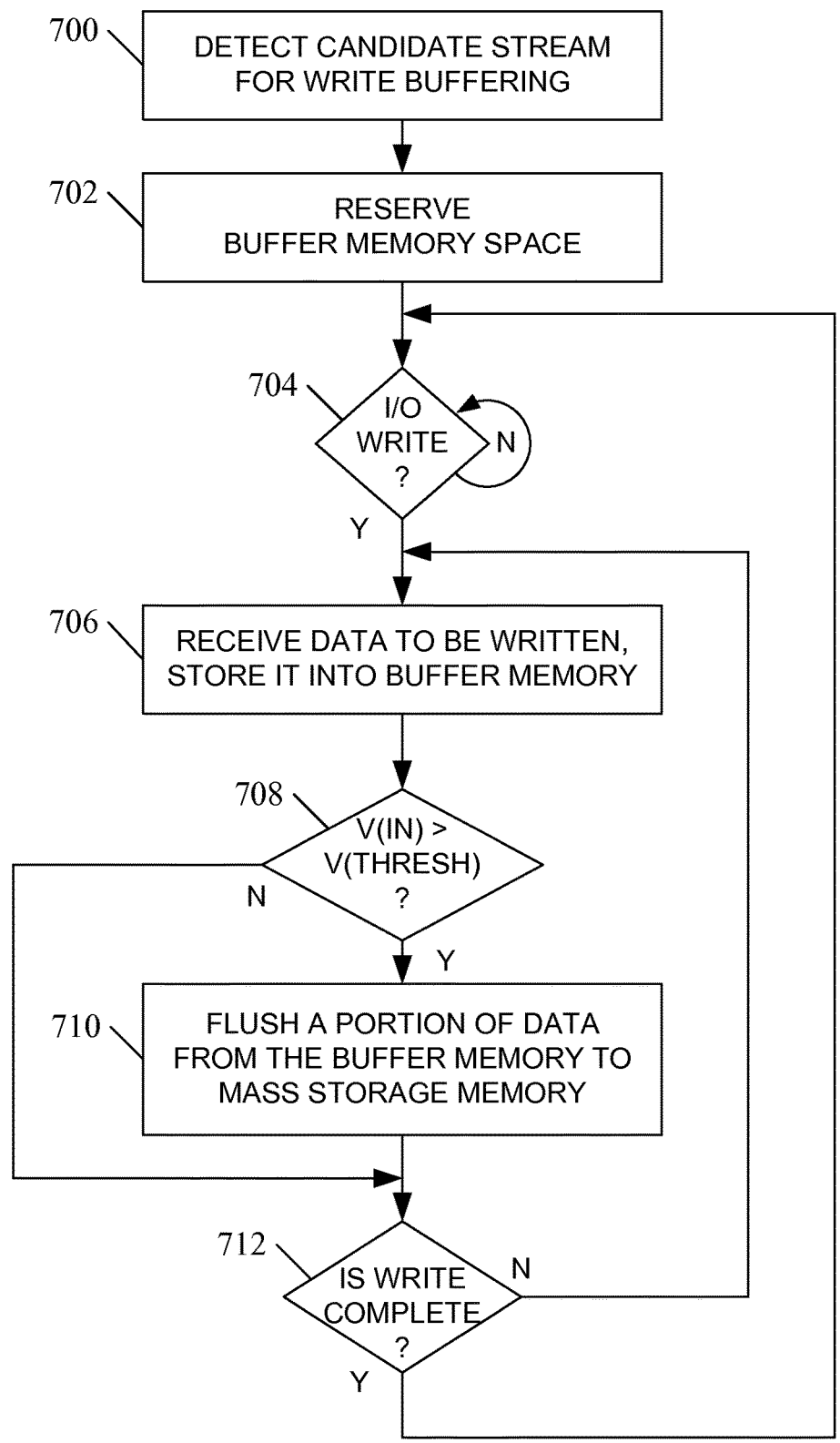
FIG. 7 is a flowchart illustrating an exemplary process for optimization of host sequential writes based on volume of data transfer according to an embodiment of the subject matter described herein.

FIG. 7 is a flowchart illustrating an exemplary process for optimization of host sequential writes based on volume of data transfer according to an embodiment of the subject matter described herein. At step 700, a write data stream is identified as a candidate for write buffering. A possible write data stream may be identified by detection that a threshold number of write commands have been received and that the commands collectively requested a write of a contiguous series of logical block addresses within a mass storage memory.

For example, if a first write command writes data to logical block addresses 0x100 through 0x1FF, a second write command writes data to logical block address 0x200 though 0x2FF, and a third write command writes data to logical block address 0x300 through 0x3FF, it may be reasonable to predict that a command to write data to logical block addresses 0x400 through 0x4FF is likely. The sequence of data write to logical block address 0x100 through 0x3FF has produced a detectable write data stream, and prediction algorithms may estimate how likely that write data stream will continue to be active, i.e., how many more contiguous logical block addresses are likely to be written to the same host. If the write data stream is likely to continue to be active, that write data stream may be a good candidate for write buffering. The example above is intended to be illustrative and not limiting; there are other ways to identify a write data stream and other factors that may be used to identify a write data stream as a candidate for write buffering.

In response to detecting a candidate stream for write buffering, at step 702, in which space for a write buffer is reserved in a buffer memory. In one embodiment, N metapages of buffer memory are reserved for storing and accumulating received write data prior to writing that data to the mass storage memory. The process then waits at step 704 until detection of an I/O write of the next data in the candidate data stream, at which time the process goes to step 706.

At step 706, data from the I/O write begins to fill the write buffer. At step 708, the volume of data that has been written to the write buffer so far, represented by the variable "V(in)", is compared to a threshold volume of data, represented by the variable "V(thresh)". If V(in) has reached or exceeded V(thresh), then at step 710 a portion of data is flushed from the write buffer to the mass storage memory, and the process goes to step 712. In one embodiment, V(thresh) corresponds to the volume of a metapage of buffer memory. In one embodiment, when the system detects that a metapage is full, data from that metapage of buffer memory is flushed to the mass storage memory and either a V(in) is reset to zero or a new V(thresh) is defined. If, at step 708, V(in) is less than V(thresh), step 710 is skipped and the process goes directly to step 712.

At step 712, the process checks to see if the write is complete. If the write is still in progress, e.g., the host is still sending write data, the process returns to step 706. If at step 712 the write is complete, the process returns to step 704, where it waits for an I/O write of next data in the data stream.

Figure 3:
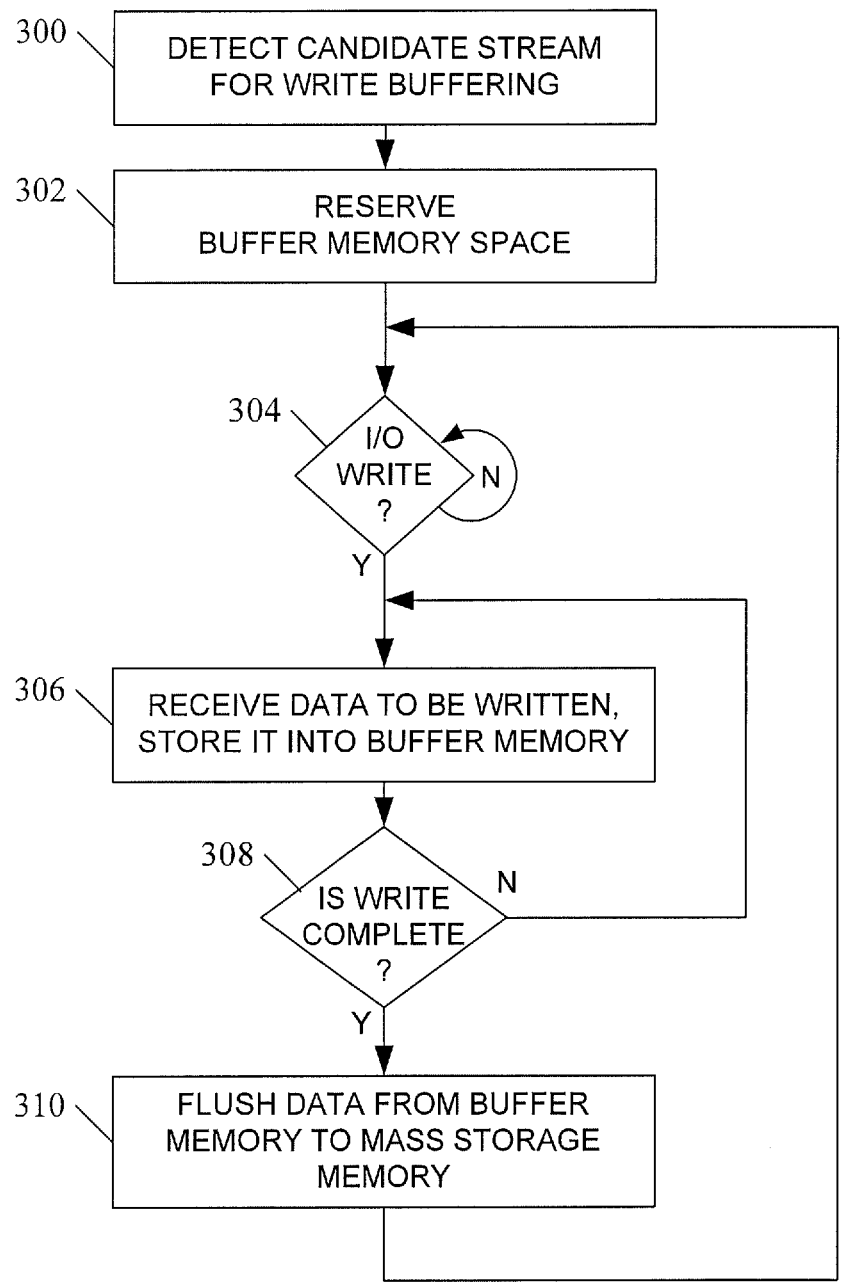
FIG. 3 is a flowchart illustrating a conventional method for performing host sequential writes.
Figure 4A:
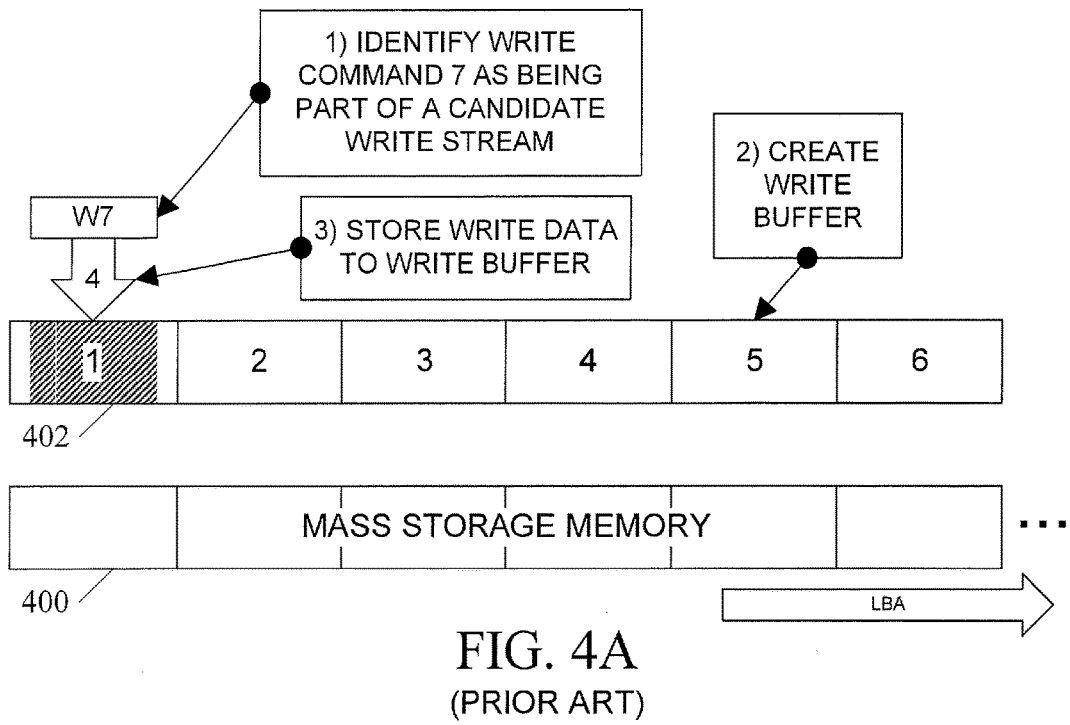
FIGS. 4A-4G show steps of an example operation according to a conventional method for performing host sequential writes.
Figure 4B:
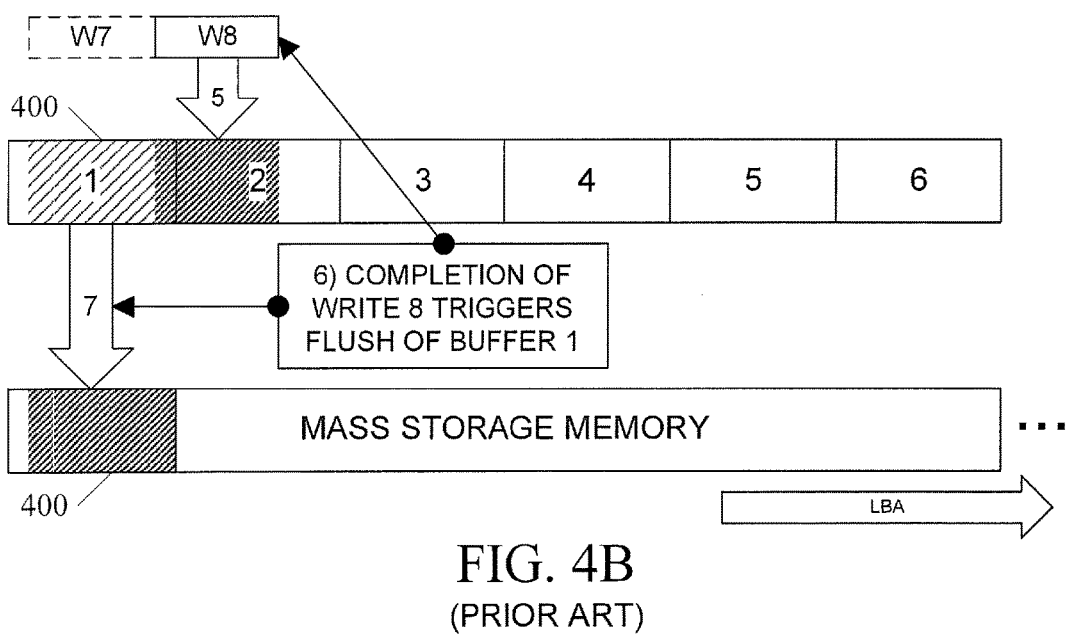
Figure 4C:
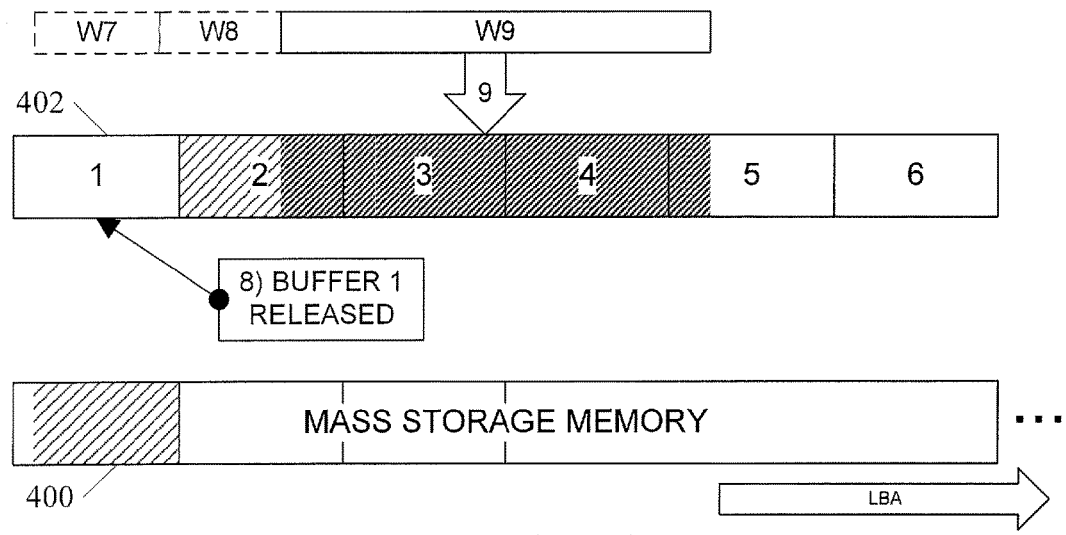
Figure 4D:
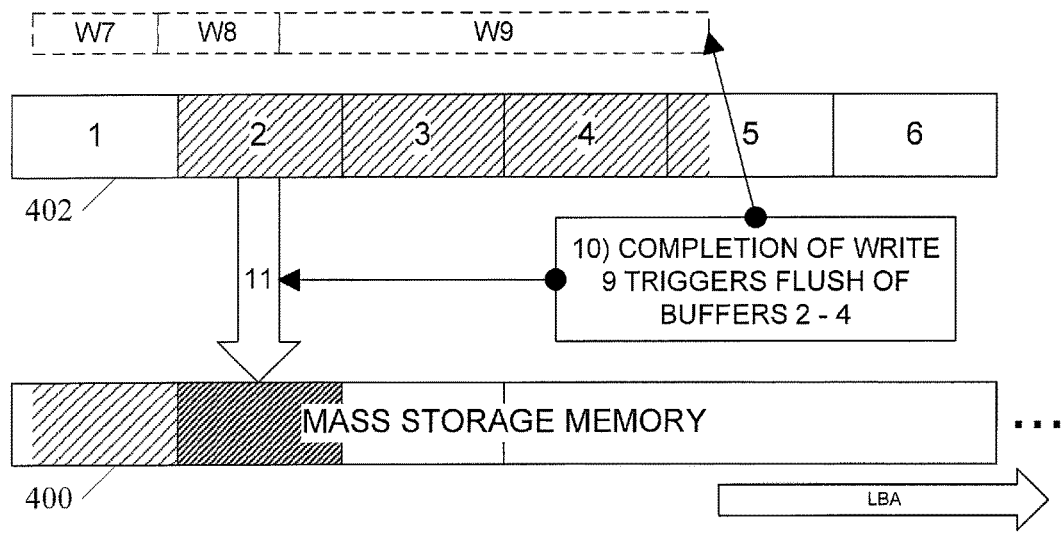
Figure 4E:
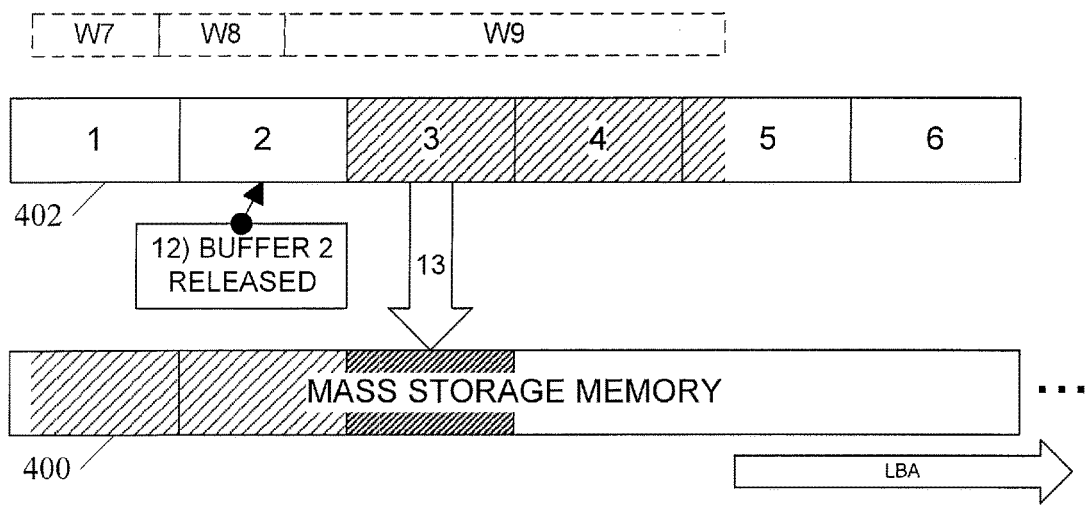
Figure 4F:
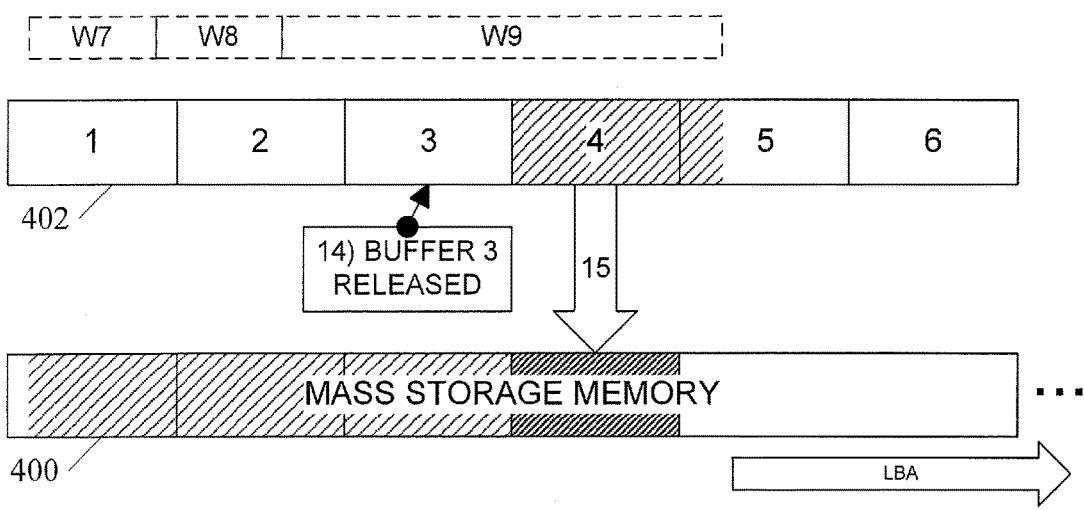
Figure 4G:
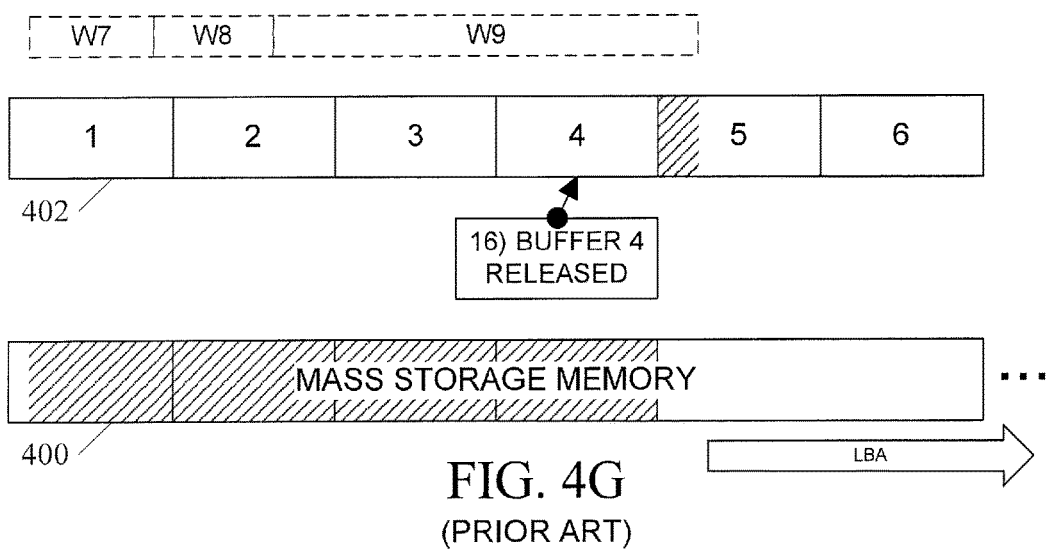

The method illustrated in FIG. 7 has advantages over the conventional method for processing sequential writes illustrated in FIG. 3. In contrast to the conventional method for processing sequential writes illustrated in FIG. 3, which flushes portions of the write buffer only after the write has completed, the process described in FIG. 7 does not wait until the write is complete to begin flushing and releasing data metapages. For this reason, the process described in FIG. 7 makes better use of buffer memory by flushing and releasing metapages of buffer memory as soon as the metapage is full rather than waiting until completion of the write that is filling the metapages of buffer memory. This is particularly beneficial where the I/O writes are large, e.g., when each I/O write fills multiple metapages of buffer memory.

The embodiment illustrated in FIG. 7 also has advantages over the conventional method shown in FIG. 3 where the I/O writes are small, e.g., when each I/O write fills only a portion of a metapage of buffer memory. In contrast to the conventional method for processing sequential writes illustrated in FIG. 3, which flushes data from buffer memory after every write, the embodiment illustrated in FIG. 7 waits until a metapage of buffer memory is full before flushing data from the buffer memory to the mass storage memory. For systems that use mass storage memory that stores data in large pages, such as NAND FLASH, waiting until a metapage of buffer memory is full before flushing the data contained therein to the mass storage memory is more efficient than flushing data from buffer memory to mass storage memory after every write even if the metapage of buffer memory is not full, as is done by the conventional method shown in FIG. 3. An additional benefit of the process described in FIG. 7 is that by reducing the number of write operations that are performed for any given write-buffered data stream, the embodiment illustrated in FIG. 7 may invoke less often the wear-balancing policies that are commonly used to extend the life of FLASH memory devices. Moreover, a system that implements the process shown in FIG. 7 may implement this process for each of one or more identified write data streams. A system that implements the process shown in FIG. 7 may also implement the process shown in FIG. 5, and vice versa.

Moreover, although the examples above focused primarily on read and write commands, e.g., detecting a read data stream by a sequence of read commands that collectively read from a contiguous set of logical block addresses in a non-volatile data store, these examples are illustrative and not intended to be limiting. For example, a read or write stream may be created from, or identified by, one or more DMA transfers.

FIGS. 8A-8E illustrate steps of an example operation according to an exemplary process for performing host sequential reads based on volume of data transfer according to an embodiment of the subject matter described herein. In the embodiment illustrated in FIG. 8A, at block 1, an incoming write command, W7, is identified as being seventh in a series of writes to a contiguous set of logical block addresses within mass storage memory 800 and thus part of a write data stream that is a candidate for write buffering. In response to identifying the write data stream, at block 2, some amount of buffer memory is reserved as a write buffer 802 for the write data stream. Write data from W7 is stored into metapage 1 of write buffer 802. This data transfer is shown as arrow 3.

In the embodiment illustrated in FIGS. 8A-8E, logical block addresses are used to measure the volume of data that has been written by the host to write buffer 802. In one embodiment, the LBA address boundaries between metapages of write buffer 802 may be values that trigger flushes of metapages. Thus, at block 4, it is noted that a logical block address boundary, and specifically the LBA boundary between metapage 1 and metapage 2 of write buffer 802, has not been crossed yet, and so metapage 1 of write buffer 802 is not flushed yet.

Thus, in contrast to the conventional method shown in FIG. 3, which flushes write buffer data after every write command, the process shown in FIGS. 8A-8E flushes buffered write data based on the volume of data received from the host and does not always flush data from the write buffer after every write command.

Figure 8A:
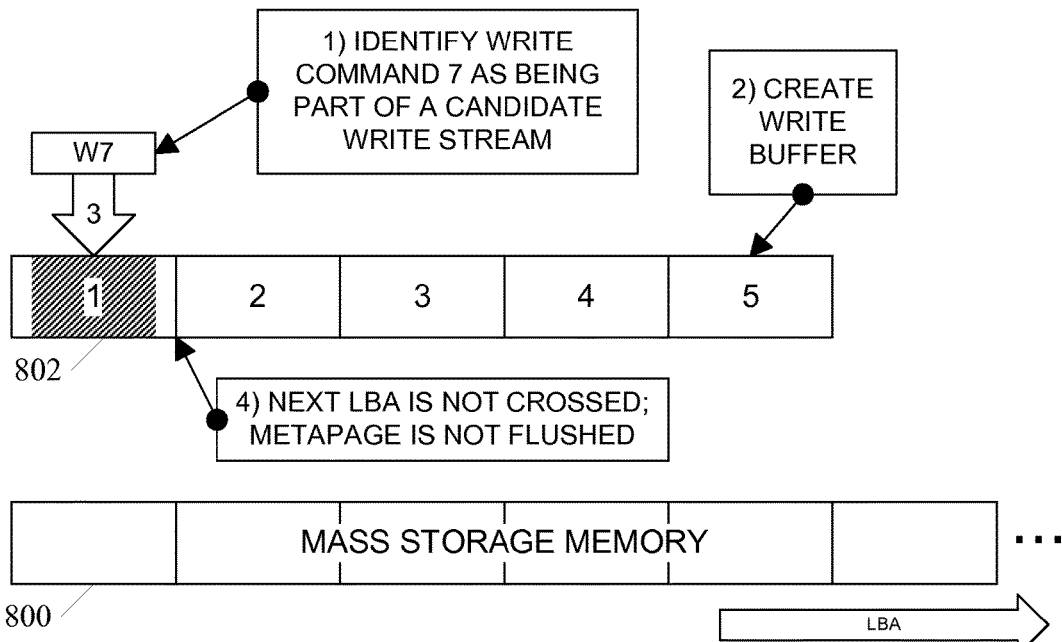
FIGS. 8A-8E illustrate steps of an example operation according to an exemplary process for performing host sequential reads based on volume of data transfer according to an embodiment of the subject matter described herein.
Figure 8B:
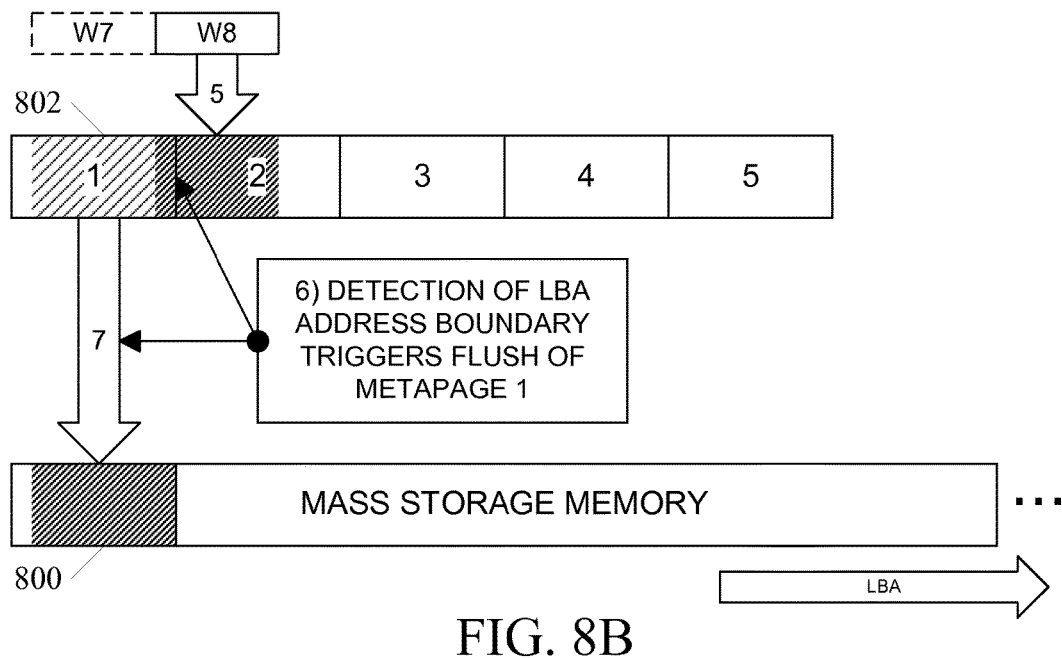

In FIG. 8B, another write command, W8, is received. Write data from W8 is stored into the next available space within write buffer 802. This data transfer is shown as arrow 5. At block 6, the system detects that the LBA of data being stored to write buffer 802 in response to W8 has crossed the LBA boundary between metapage 1 and metapage 2 of write buffer 802. This trigger causes the contents of metapage 1 of write buffer 802 to be flushed to mass storage memory 800. In one embodiment, in circumstances where only a portion of metapage 1 contains valid write data, only that portion of metapage 1 that contains valid write data will be flushed to mass storage memory 800.

Figure 8C:
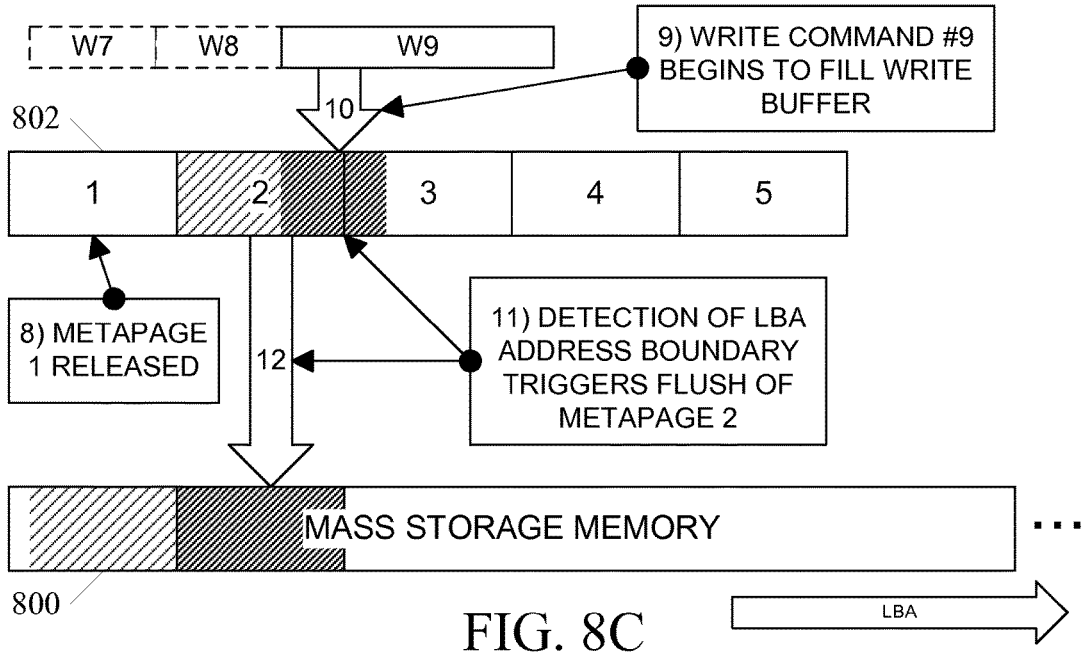

In FIG. 8C, block 8, metapage 1 of write buffer 802 is released, i.e., made available to store new incoming write data from the host. At block 9, another write command, W9, is received, and write data from W9 begins to fill write buffer 802. This data transfer is shown as arrow 10. At block 11, the system detects that the LBA of data being stored to write buffer 802 in response to W9 has crossed the LBA boundary between metapage 2 and metapage 3 of write buffer 802. This trigger causes the contents of metapage 2 of write buffer 802 to be flushed to mass storage memory 800. This data transfer is shown as arrow 12.

Figure 8D:
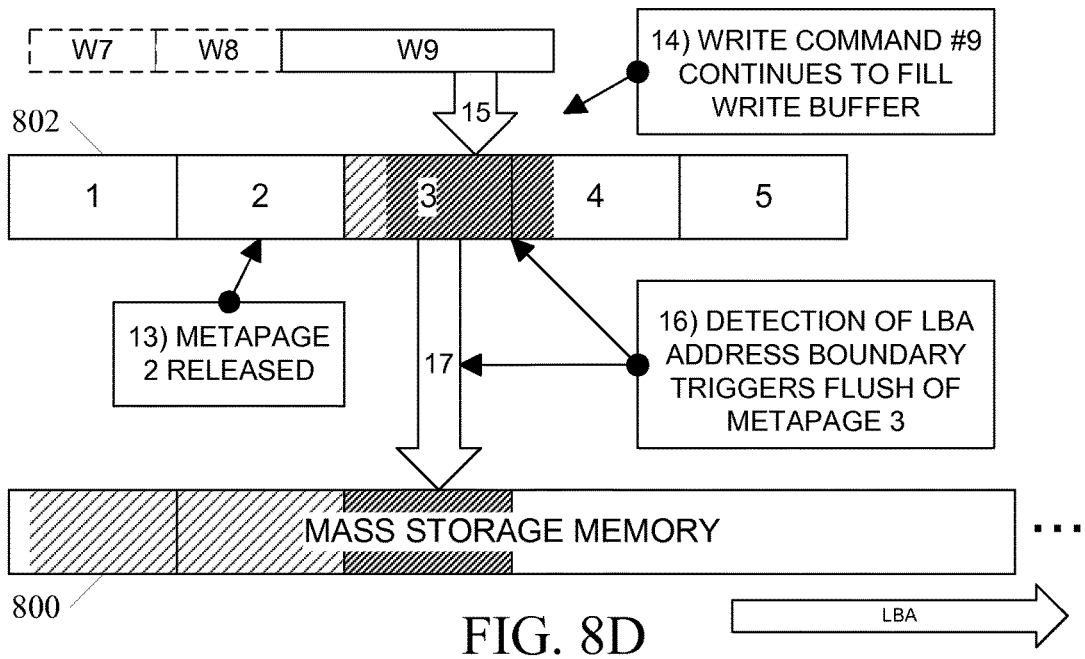

In FIG. 8D, block 13, metapage 2 of write buffer 802 is released. At block 14, write data from W9 continues to fill write buffer 802. This data transfer is shown as arrow 15. At block 16, the system detects that the LBA of data being stored to write buffer 802 in response to W9 has crossed another LBA boundary, this time between metapage 3 and metapage 4 of write buffer 802. This trigger causes the contents of metapage 3 of write buffer 802 to be flushed to mass storage memory 800. This data transfer is shown as arrow 17.

Thus, in contrast to the conventional method shown in FIG. 3, which does not flush the write buffer until after a write command has fully completed, the process shown in FIGS. 8A-8E flush metapages of write buffer 802 as soon as they are filled or can contain no additional valid data, even during the execution of a write command. One advantage that the process shown in FIGS. 8A-8E has over the conventional method shown in FIG. 3 is that the method shown in Figure requires a write buffer that is at least as big as the largest amount of data that a write command may send. In contrast, the process shown in FIGS. 8A-8E can operate using a write buffer that is smaller than amount of data being sent by a write command, since metapages of the write buffer are flushed as soon as they are full and can therefore be reused for the same write command.

Figure 8E:
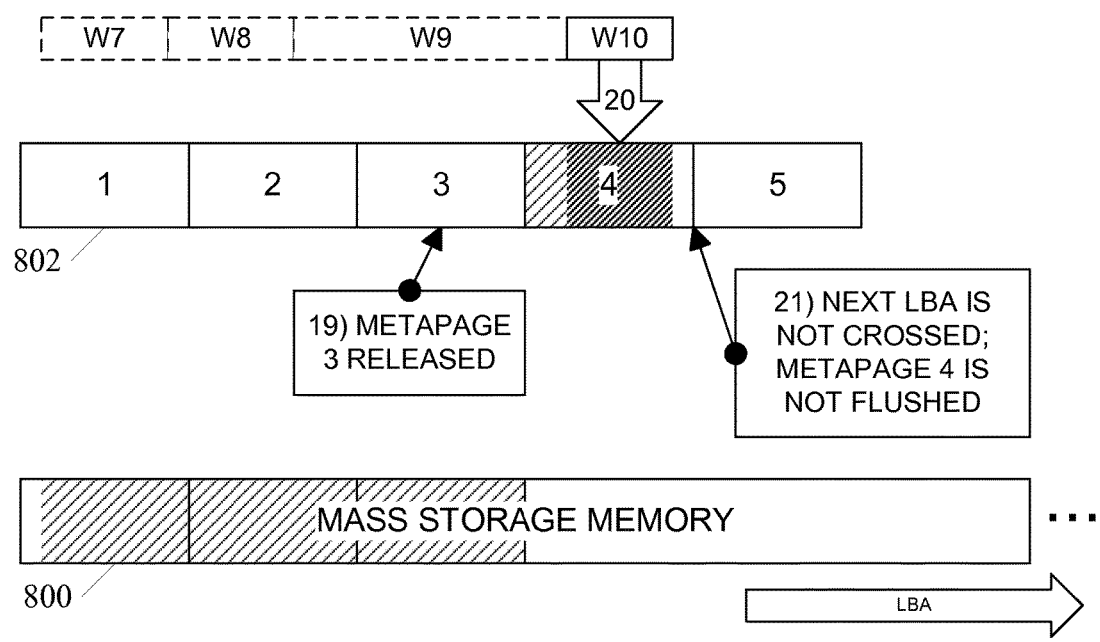

In FIG. 8E, block 19, metapage 3 is released. Another write command, W10, is received, and write data for W10 is stored in write buffer 802. This data transfer is shown as arrow 20. At block 21, it is noted that a logical block address boundary, and specifically the LBA boundary between metapage 4 and metapage 5 of write buffer 802, has not been crossed yet, and so metapage 4 of write buffer 802 is not flushed yet. By waiting until the metapage is as full as it can get, the system maximizes the benefits of write buffering.

Figure 9:
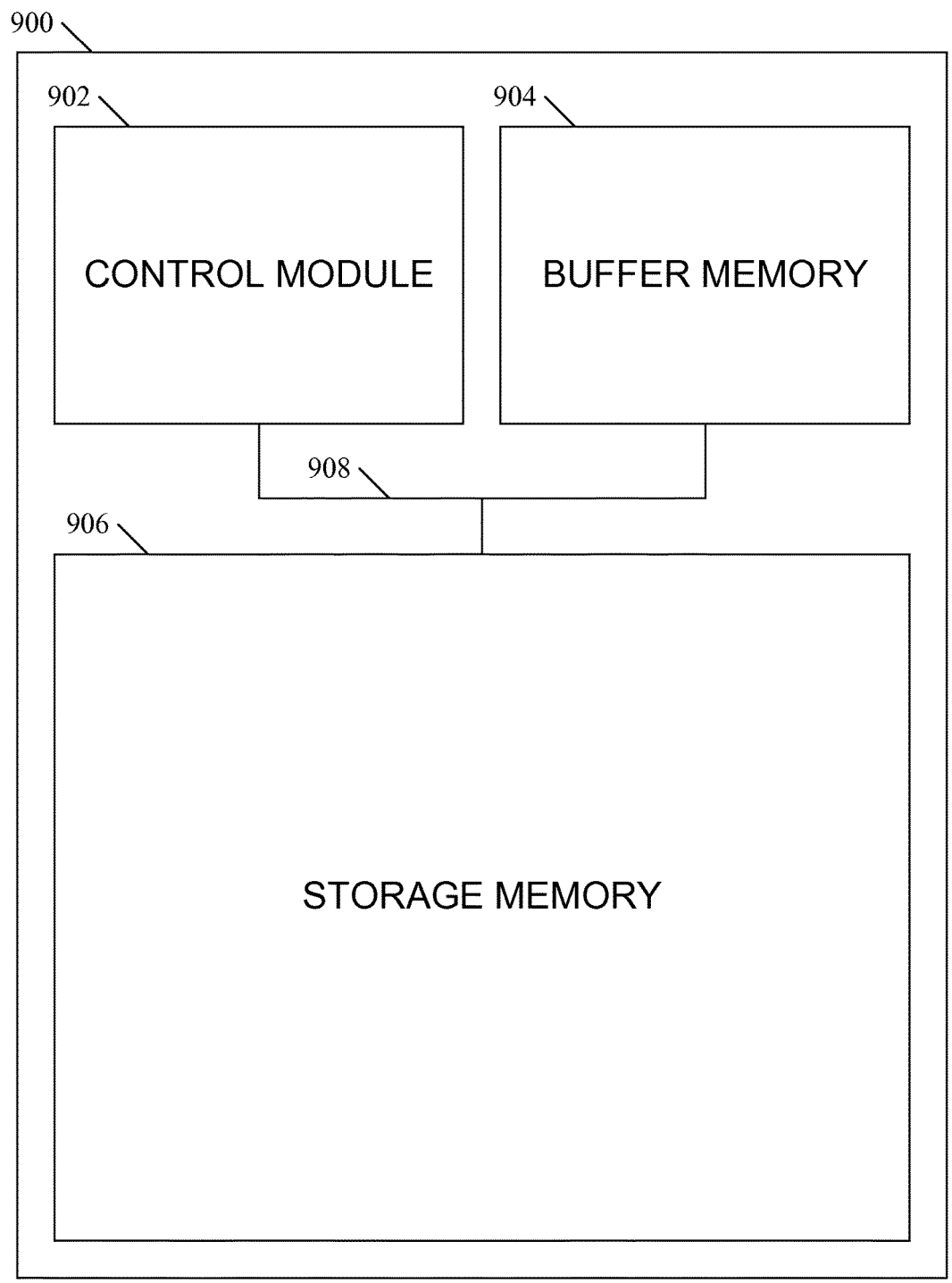
FIG. 9 is a block diagram illustrating an exemplary system for optimization of host sequential reads or writes based on volume of data transfer according to an embodiment of the subject matter described herein.

FIG. 9 is a block diagram illustrating an exemplary system for optimization of host sequential reads or writes based on volume of data transfer according to an embodiment of the subject matter described herein. In the embodiment illustrated in FIG. 9, system 900 includes a control module 902 that communicates with a buffer memory 904 and a mass storage memory 906 via an internal bus 908.

In one embodiment, system 900 may be a non-volatile mass storage device. For example, mass storage memory 906 may include FLASH memory, a solid state drive (SSD), a hard disk drive (HDD), or combinations of the above. In one embodiment, buffer memory 904 may include a random access memory (RAM), such as a DDR memory, a dual port RAM, a cache memory, and the like. In one embodiment, internal bus 908 may include a data bus, a command bus, dedicated signal lines, a switching fabric, and the like. In one embodiment, system 900 may include an interface module (not shown) for receiving I/O commands, such as read requests and write requests, from a requesting entity, such as a host computer.

Control module 902 may include a hardware controller, application specific integrated circuit (ASIC), field programmable gate array (FPGA), or other logic circuit, and may also include a software and/or firmware component.

In one embodiment, control module 902 may implement a method for optimization of host sequential reads based on volume of data transfer, in which case control module 902 may be configured to pre-fetch a first volume of predicted data associated with an identified read data stream from mass storage memory 906 into buffer memory 904. When a request for data from the read data stream is received from a host, control module 902 responds to that request by providing the requested data to the host from buffer memory 904. While providing the requested data to the host from buffer memory 904, control module 902 determines whether a threshold volume of data has been provided to the host from buffer memory 904: if so, control module 902 pre-fetches a second volume of predicted data associated with the identified read data stream from mass storage memory 906 and stores this data into buffer memory 904; if not, no additional predicted data associated with the identified read data stream is pre-fetched from mass storage memory 906.

In one embodiment, control module 902 may implement a method for optimization of host sequential reads based on volume of data transfer, in which case control module 902 may be configured to reserve a first volume of buffer memory 904 as a write buffer for storing and accumulating write data associated with an identified write data stream. When a request to store data associated with the identified write data stream into mass storage memory 906 is received from a host, control module 902 responds to the request by storing the data associated with the identified write data stream to buffer memory 904 instead of to mass storage memory 906. While storing the data to buffer memory 904, control module 902 determines whether a threshold volume of data has been written to buffer memory 904: if so, a second volume of data is flushed from buffer memory 904 to mass storage memory 906; and if not, data is not flushed from buffer memory 904 to mass storage memory 906.

It will be understood that various details of the subject matter described herein may be changed without departing from the scope of the subject matter described herein. For example, rather than using logical block addresses to measure the volume of data transferred, in one embodiment, a counter, such as a byte counter or a sector counter, may be used to calculate V(in) and V(out). Furthermore, the foregoing description is for the purpose of illustration only, and not for the purpose of limitation.

What is claimed is:

1. A method for managing data streams at a mass data storage device, the method comprising:

pre-fetching a first volume of predicted data associated with a read data stream from a data store into a buffer memory different from the data store;

servicing requests for data of the read data stream from the buffer memory, wherein servicing a request from the buffer memory comprises providing data of the request to a host from the buffer memory and selectively performing a pre-fetch operation for the request by:

determining an output data volume for the request, the output data volume quantifying a volume of data provided to the host from the buffer memory since a last pre-fetch operation, comparing the output data volume determined for the request to a threshold, performing the pre-fetch operation for the request when the output data volume determined for the request is greater than or equal to the threshold, and skipping the pre-fetch operation for the request when the output data volume determined for the request is less than the threshold, wherein performing the pre-fetch operation for the request comprises pre-fetching a second volume of predicted data associated with the read data stream from the data store into the buffer memory while providing the requested data to the host from the buffer memory, and wherein skipping the pre-fetch operation for the request comprises servicing the request without pre-fetching the second volume of predicted data associated with the read data stream from the data store.

2. The method of claim 1, further comprising receiving the request, wherein the request comprises one or more of a read command and a direct memory access (DMA) transfer request.

3. The method of claim 1, wherein determining the output data volume for the request comprises at least one of:
   determining a number of bytes of data of the read data stream output from the buffer memory since the last pre-fetch operation; and
   determining a range of logical block addresses requested from the buffer memory since the last pre-fetch operation.

4. The method of claim 1, wherein the buffer memory is divided into a plurality of metapages and wherein a maximum number of metapages is reserved for the read data stream.

5. The method of claim 4, wherein the first volume of predicted data comprises a number of metapages less than or equal to the maximum number of metapages reserved for the read data stream.

6. The method of claim 5, wherein determining the output data volume for the request comprises determining a number of metapages provided to the host from the buffer memory since the last pre-fetch operation.

7. The method of claim 5, wherein performing the pre-fetch operation for the request comprises storing the second volume of predicted data associated with the identified read data stream into one or more metapages of the buffer memory.

8. The method of claim 4, wherein servicing the request further comprises:
   identifying a metapage of the buffer memory used to store data that has been provided to the host; and
   making the identified metapage available to store new read data.

9. The method of claim 1, wherein determining the output data volume for the request comprises maintaining a counter for the read data stream, the counter monitoring data transferred to the host from the buffer memory since the last pre-fetch operation, and wherein performing the pre-fetch operation for the request comprises resetting the counter.

10. A method for managing sequential writes at a mass data storage device, comprising:
    reserving a write buffer within a buffer memory for a write data stream;
    servicing requests to store data associated with the write data stream into a data store different from the buffer memory, wherein servicing a request to store data associated with the write data stream comprises storing the data associated with the write data stream to the write buffer instead of to the data store and selectively flushing the write buffer responsive to the request, by:
        determining an input data volume for the request, the input data volume quantifying a volume of data written to the write buffer since a last flush operation was performed on the write buffer,
        comparing the input data volume determined for the request to a threshold,
        performing a flush operation for the request when the input data volume is greater than or equal to the threshold, and
        skipping the flush operation for the request when the input data volume is less than the threshold,
    wherein performing the flush operation for the request comprises copying a portion of data stored in the write buffer to the data store, and
    wherein skipping the flush operation for the request comprises servicing the request without copying the portion of the data stored in the write buffer to the data store.

11. The method of claim 10, further comprising receiving the request to write data to the write data stream, wherein receiving the request comprises receiving one of a write request and a request for a direct memory access (DMA) transfer.

12. The method of claim 10, wherein determining the input data volume for the request comprises at least one of:
    determining a number of bytes written to the write buffer since the flush operation; and
    determining a range of logical block addresses written to the write buffer since the last flush operation.

13. The method of claim 10, wherein the buffer memory is divided into a plurality of metapages and wherein a maximum number of metapages is reserved for the write buffer.

14. The method of claim 13, wherein determining the input data volume for the request comprises one or more of:
    determining whether the request fills a metapage within the write buffer, and
    identifying a metapage of the write buffer that has no additional capacity to store write data from a host.

15. The method of claim 13, wherein performing the flush operation for the request comprises copying data from at least one metapage within the write buffer to the data store.

16. The method of claim 13, wherein servicing the request further comprises:
    identifying a metapage of the write buffer used to store data that has been copied to the data store, and
    making the identified metapage available to store new write data.

17. The method of claim 10, wherein determining the input data volume for the request comprises maintaining a byte counter for the write data stream, the byte counter indicating a number of bytes of the write data stream stored to the write buffer since the last flush operation, and wherein performing the flush operation for the request comprises resetting the byte counter.

18. A system, comprising:
    a data store;
    a buffer memory different from the data store; and
    a controller configured to:
        pre-fetch a first volume of predicted data associated with an identified read data stream from the data store into the buffer memory, wherein the buffer memory is configured to store data corresponding to one or more logical block addresses ranges spanning one or more address boundaries;
        execute commands to read specified logical block addresses of the identified read data stream by use of the buffer memory, wherein to execute a command to read specified logical block addresses, the controller is configured to provide data corresponding to the specified logical block addresses from the buffer memory and to selectively perform an additional pre-fetch operation for the command, by:
            comparing the specified logical block addresses of the command to an address boundary corresponding to a range of logical block addresses of the read data stream stored in the buffer memory, performing the additional pre-fetch operation for the command in response to determining that the specified logical block addresses of the command cross the logical block address, and deferring the additional pre-fetch operation for the command in response to determining that the specified logical block addresses of the command are within the address boundary, wherein performing the additional pre-fetch operation for the command comprises pre-fetching a second volume of predicted data associated with the identified read data stream from the data store into the buffer memory, and wherein deferring the additional pre-fetch operation for the command comprises completing execution of the command without pre-fetching the second volume of predicted data associated with the identified read data stream from the data store into the buffer memory.

19. The system of claim 18, wherein the data store comprises a memory storage device that has slower access time than the buffer memory.

20. The system of claim 18, wherein the data store comprises at least one of a non-volatile memory and a remote memory.

21. The system of claim 18, wherein the buffer memory comprises at least one of a dynamic random-access memory, a static random-access memory, a dual-port memory, and a dual data-rate memory.

22. A system, comprising:
a data store;
a buffer memory different from the data store; and
a controller configured to:
reserve a first volume of the buffer memory as a write buffer for a write data stream, the write buffer being configured to store data corresponding to a range of logical block addresses, the range spanning one or more address boundaries;
execute commands to write data to specified logical block addresses by use of the write buffer, wherein to execute a command to write data to specified logical block addresses, the controller is configured to store the data of the specified logical block addresses in the write buffer instead of the data store and to selectively perform a flush operation on the write buffer for the command, by:
determining whether the specified logical block addresses of the command cross an address boundary within the write address buffer,
performing the flush operation on the write buffer for the command in response to determining that the specified logical block addresses of the command cross the address boundary within the address buffer, and
deferring the flush operation for the command in response to determining that the specified logical block addresses of the command are within address boundaries of the write buffer,
wherein performing the flush operation for the command comprises copying at least a portion of a first volume of data from the write buffer to the data store, and
wherein deferring the flush operation for the command comprises completing execution of the write command in the write buffer without copying the portion of the first volume of data from the write buffer to the data store.

23. The system of claim 22, wherein the data store comprises a memory storage device having a higher write latency than a write latency of the buffer memory.

24. The system of claim 22, wherein the data store comprises at least one of a non-volatile memory and a remote memory.

25. The system of claim 22, wherein the buffer memory comprises at least one of a dynamic random-access memory, a static random-access memory, a dual-port memory, and a dual data-rate memory.

26. A non-transitory computer readable medium having stored thereon executable instructions that, when executed by a processor of a computer, control the computer to perform steps, comprising:
pre-fetching a first volume of predicted data associated with an identified read data stream from a data store into a buffer memory different from the data store; and
receiving requests for data of the read data stream from a host, wherein, in response to receiving a particular request for data of the read data stream, the steps further comprise:
providing data to the host from the buffer memory,
determining a volume of data provided to the host from the buffer memory responsive to one or more requests, the one or more requests comprising requests received after a last pre-fetch operation performed on the buffer memory, including the particular request,
comparing the determined volume of data to a threshold,
performing an additional pre-fetch operation responsive to the particular request when the determined volume of data exceeds the threshold, and
skipping the additional pre-fetch operation responsive to the particular request when the determined volume of data is less than the threshold,
wherein performing the additional pre-fetch operation comprises pre-fetching a second volume of predicted data associated with the identified read data stream into the buffer memory from the data store in response to the particular request, and
wherein skipping the additional pre-fetch operation comprises completing the particular request without pre-fetching from the data store any additional predicted data associated with the identified read data stream.

27. A non-transitory computer readable medium having stored thereon executable instructions that, when executed by a processor of a computer, control the computer to perform steps comprising:
reserving a first volume of a buffer memory as a write buffer for an identified write data stream;
receiving requests to write data associated with the identified write data stream into a data store different from the buffer memory, wherein, in response to receiving a particular request to write data of the identified data stream, the steps further comprise:
writing data of the particular request to the write buffer instead of to the data store,
determining a volume of data written to the write buffer responsive to one or more requests, the one or more requests comprising requests received after a last flush operation performed on the write buffer, including the particular request,
comparing the determined volume of data to a threshold, performing a flush operation for the particular request when the volume of data written to the write buffer reaches or exceeds the threshold, and skipping the flush operation for the particular request when the determined volume of data is less than the threshold, wherein performing the flush operation for the particular request comprises copying a portion of a first volume of data from the write buffer to the data store, and wherein skipping the flush operation comprises completing the particular request without copying the portion of the first volume of data from the write buffer to the data store.

* * * * *